(12) United States Patent
Liu et al.

(10) Patent No.: US 12,171,029 B2
(45) Date of Patent: Dec. 17, 2024

(54) METHOD AND DEVICE IN NODE USED FOR WIRELESS COMMUNICATION

(71) Applicants: Jin Liu, Shanghai (CN); Xiaobo Zhang, Shanghai (CN)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 696 days.

(21) Appl. No.: 17/382,327

(22) Filed: Jul. 21, 2021

(65) Prior Publication Data

US 2021/0352740 A1  Nov. 11, 2021

Related U.S. Application Data

(63) Continuation of application No. PCT/CN2019/129271, filed on Dec. 27, 2019.

(30) Foreign Application Priority Data

Jan. 22, 2019 (CN) .......................... 201910059317.5

(51) Int. Cl.
*H04W 74/0833* (2024.01)
*H04W 72/0446* (2023.01)
(Continued)

(52) U.S. Cl.
CPC ... *H04W 74/0836* (2024.01); *H04W 72/0446* (2013.01); *H04W 72/0453* (2013.01);
(Continued)

(58) Field of Classification Search
CPC ......... H04W 74/0841; H04W 72/0446; H04W 72/0453; H04W 74/006; H04W 80/02;
(Continued)

(56) References Cited

U.S. PATENT DOCUMENTS

2018/0124822 A1   5/2018  Wang et al.
2018/0368188 A1*  12/2018 Aiba ................. H04W 74/0833
(Continued)

FOREIGN PATENT DOCUMENTS

CN      108271275 A     7/2018
CN      108282901 A     7/2018
(Continued)

OTHER PUBLICATIONS

ISR in application PCT/CN2019/129271 dated Feb. 11, 2020.
(Continued)

*Primary Examiner* — Ashley Shivers

(57) ABSTRACT

The present disclosure provides a method and device in a node for wireless communications. A first node transmits a first sequence and a first radio signal, the first sequence is associated with the first radio signal; and receives a second radio signal; the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block. Through the re-analyzing of the existing signalings, the present disclosure avoids extra signaling overhead, realizes contention resolution of 2-step RACH, and supports flexible switching between 2-step RACH and 4-step RACH.

20 Claims, 7 Drawing Sheets

(51) Int. Cl.
*H04W 72/0453* (2023.01)
*H04W 74/00* (2009.01)
*H04W 74/0836* (2024.01)
*H04W 80/02* (2009.01)

(52) U.S. Cl.
CPC ..... *H04W 74/006* (2013.01); *H04W 74/0833* (2013.01); *H04W 74/0841* (2013.01); *H04W 80/02* (2013.01)

(58) Field of Classification Search
CPC . H04W 74/0833; H04W 74/008; Y02D 30/70
See application file for complete search history.

(56) References Cited

U.S. PATENT DOCUMENTS

| | | | |
|---|---|---|---|
| 2020/0045745 A1* | 2/2020 | Cirik | H04W 24/08 |
| 2020/0107372 A1* | 4/2020 | Agiwal | H04W 24/08 |
| 2021/0168862 A1* | 6/2021 | Murray | H04W 74/002 |

FOREIGN PATENT DOCUMENTS

| | | |
|---|---|---|
| WO | 2018175809 A1 | 9/2018 |
| WO | 2018232003 A1 | 12/2018 |

OTHER PUBLICATIONS

ZTE et al. "Consideration on the Two-step RACH in NR" 3GPPTSG-RANWG2 NRAd Hoc; R2-1700155,Jan. 7, 2017 (Jan. 7, 2017))main body, pp. 1-5.
Second Office Action of Chinese patent application No. CN201910059317.5 dated Feb. 18, 2023.
Notification to Grant Patent Right for Invention of Chinese patent application No. CN201910059317.5 dated Mar. 17, 2023.
The extended European search report in application 19911035.4 dated Mar. 15, 2022.
First Office Action of Chinses patent application No. CN201910059317.5 dated Oct. 18, 2022.
First Search Report of Chinses patent application No. CN201910059317.5 dated Oct. 10, 2022.

* cited by examiner

Case A  First information format

Case B  Second information format

METHOD AND DEVICE IN NODE USED FOR WIRELESS COMMUNICATION

CROSS REFERENCE TO RELATED APPLICATIONS

This application is a continuation of International Application No. PCT/CN2019/129271, filed Dec. 27, 2019, claims the priority benefit of Chinese Patent Application No. 201910059317.5, filed on Jan. 22, 2019, the full disclosure of which is incorporated herein by reference.

BACKGROUND

Technical Field

The present disclosure relates to transmission methods and devices in wireless communication systems, and in particular to a transmission scheme and device related to random access in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

To adapt to a variety of application scenarios and meet different requirements, a study item (SI) of NR Non-orthogonal Multiple Access (NoMA) was also approved at 3GPP RAN #76th plenary. The SI was started from Release 16 and soon after its completion a WI was initiated to standardize relevant techniques. Following the NoMA SI, the WI of 2-step Random Access (2-step RACH) under NR was approved at 3GPP RAN #82 plenary.

SUMMARY

For User Equipment (UE) in Release 16 and subsequent versions, both 2-step Random Access (RACH) procedure and 4-step RACH procedure can be adopted. The conventional 4-step RACH comprises interactions of four messages, including Msg1, Msg2, Msg3 and Msg4, while the 2-step RACH only comprises interactions of two messages, including MsgA and MsgB, therefore, the 2-step RACH can greatly shorten time delay of random access, thus reducing signaling overhead. According to the requirements of WI of the 2-step RACH, a User Equipment (UE) can switch between the 2-step RACH and the 4-step RACH or fall back from the 2-step RACH to the 4-step RACH. For the 2-step RACH, new MsgB needs to take partial functions of the conventional Msg2 and Msg4 into account. The present disclosure provides a solution for the design of MsgB, which can not only solve conflicts in random access in MsgB, but also support instant fallback of the 2-step RACH and the 4-step RACH. It should be noted that the embodiments of a base station and the characteristics of the embodiments in the present disclosure may be applied to a UE if no conflict is incurred, and vice versa. Further, the embodiments and the characteristics of the embodiments in the present disclosure may be mutually combined if no conflict is incurred.

The present disclosure provides a method in a first node for wireless communications, comprising:
transmitting a first sequence and a first radio signal, the first sequence being associated with the first radio signal; and
receiving a second radio signal;
herein, the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

In one embodiment, the first node, through jointly analyzing a value interval in which a first value in the present disclosure is not used and a first field, determines that a second radio signal in the present disclosure is MsgB of 2-step RACH, or determines that a second radio signal in the present disclosure is Msg2 of 4-step RACH.

In one embodiment, the first node, according to a position of a first information block in the present disclosure in X first-type information block(s), judges whether a first field in the first information block is used to determine an information format of a second information block in the present disclosure.

In one embodiment, the above method is advantageous in that by re-analyzing the existing signaling, extra signaling overhead is avoided, which achieves contention resolution of 2-sep RACH and supports flexible switching between the 2-step RACH and 4-step RACH.

According to one aspect of the present disclosure, the above method in characterized in that the first field and a value interval to which the first value belongs are used to determine an information format of the second information block.

According to one aspect of the present disclosure, the above method in characterized in that the second radio signal comprises Y second-type information block(s), and the second information block is one of the Y second-type information block(s), Y being a positive integer; the Y second-type information block(s) comprises (respectively comprise) Y first-type identifier(s); when the target identifier is one of the Y first-type identifier(s), the Y second-type information block(s) comprises (comprise) a second target information block, and the second target information block is one of the Y second-type information block(s) corresponding to the target identifier.

According to one aspect of the present disclosure, the above method in characterized in that the second radio signal comprises X first-type information block(s), and the first information block is one of the X first-type information block(s), X being a positive integer; the X first-type information block(s) comprises (respectively comprise) X first-type field(s), the first field is one of the X first-type field(s), a position of the first information block in the X first-type information block(s) is used to determine whether the first field is used to determine whether the second radio signal comprises the Y second-type information block(s).

According to one aspect of the present disclosure, the above method in characterized in that a value interval to which the first value belongs is a first value interval, and the first value interval is different from the second value interval; an illegal communication node assumes that the first value only belongs to the first value interval out of the first value interval and the second value interval.

According to one aspect of the present disclosure, the above method in characterized in that a value interval to which the first value belongs is a second value interval, and the first value interval is different from the second value interval; an illegal communication node assumes that the first value only belongs to the first value interval out of the first value interval and the second value interval.

According to one aspect of the present disclosure, the above method is characterized in comprising:

receiving a first signaling in a first time window;

herein, at least one of air-interface resources occupied by the first sequence or air-interface resources occupied by the first radio signal are used to determine a start time of the first time window; the first signaling is used to determine at least one of time-frequency resources occupied by the second radio signal or a Modulation and Coding Scheme (MCS) adopted by the second radio signal.

According to one aspect of the present disclosure, the above method is characterized in comprising:

receiving a third information block;

herein, the third information block is used to determine a time length of a first time window.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:

receiving a first sequence and a first radio signal, the first sequence being associated with the first radio signal; and transmitting a second radio signal;

herein, the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

According to one aspect of the present disclosure, the above method in characterized in that the first field and a value interval to which the first value belongs are used to determine an information format of the second information block.

According to one aspect of the present disclosure, the above method in characterized in that the second radio signal comprises Y second-type information block(s), and the second information block is one of the Y second-type information block(s), Y being a positive integer; the Y second-type information block(s) comprises (respectively comprise) Y first-type identifier(s); when the target identifier is one of the Y first-type identifier(s), the Y second-type information block(s) comprises (comprise) a second target information block, and the second target information block is one of the Y second-type information block(s) corresponding to the target identifier.

According to one aspect of the present disclosure, the above method in characterized in that the second radio signal comprises X first-type information block(s), and the first information block is one of the X first-type information block(s), X being a positive integer; the X first-type information block(s) comprises (respectively comprise) X first-type field(s), the first field is one of the X first-type field(s), a position of the first information block in the X first-type information block(s) is used to determine whether the first field is used to determine whether the second radio signal comprises the Y second-type information block(s).

According to one aspect of the present disclosure, the above method in characterized in that a value interval to which the first value belongs is a first value interval, and the first value interval is different from the second value interval; an illegal communication node assumes that the first value only belongs to the first value interval out of the first value interval and the second value interval.

According to one aspect of the present disclosure, the above method in characterized in that a value interval to which the first value belongs is a second value interval, and the first value interval is different from the second value interval; an illegal communication node assumes that the first value only belongs to the first value interval out of the first value interval and the second value interval.

According to one aspect of the present disclosure, the above method is characterized in comprising:

transmitting a first signaling in a first time window;

herein, at least one of air-interface resources occupied by the first sequence or air-interface resources occupied by the first radio signal are used to determine a start time of the first time window; the first signaling is used to determine at least one of time-frequency resources occupied by the second radio signal or an MCS adopted by the second radio signal.

According to one aspect of the present disclosure, the above method is characterized in comprising:

transmitting a third information block;

herein, the third information block is used to determine a time length of a first time window.

According to one aspect of the present disclosure, the above method is characterized in that the second node is a base station.

According to one aspect of the present disclosure, the above method is characterized in that the second node is a relay node.

The present disclosure provides a first node for wireless communications, comprising:

a first transmitter, which transmits a first sequence and a first radio signal, the first sequence being associated with the first radio signal; and a first receiver, which receives a second radio signal;

herein, the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

The present disclosure provides a second node for wireless communications, comprising:

a third receiver, which receives a first sequence and a first radio signal, the first sequence being associated with the first radio signal; and a second transmitter, which transmits a second radio signal;

herein, the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

In one embodiment, the present disclosure is advantageous in the following aspects:

the present disclosure, through jointly analyzing a value interval in which a first value in the present disclosure is not used and a first field, determines that a second radio signal in the present disclosure is MsgB of 2-step RACH, or determines that a second radio signal in the present disclosure is Msg2 of 4-step RACH.

the present disclosure, according to a position of a first information block in the present disclosure in X first-type information block(s), judges whether a first field in the first information block is used to determine an information format of a second information block in the present disclosure.

the present disclosure, through re-analyzing the existing signalings, avoids extra signaling overhead, achieves contention resolution of 2-step RACH, and supports flexible switching between the 2-step RACH and 4-step RACH.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
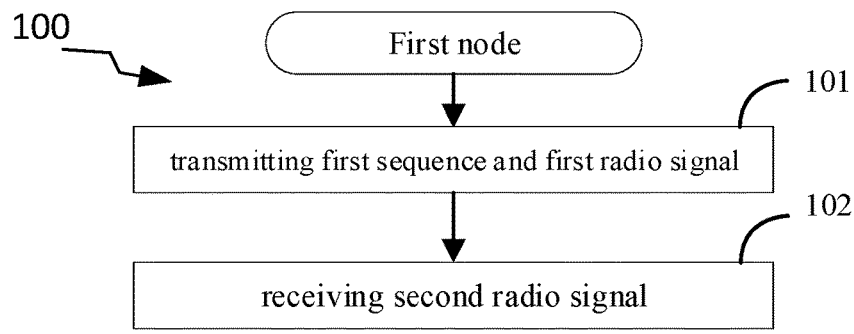
FIG. 1 illustrates a flowchart of the processing of a first node according to one embodiment of the present disclosure.

Embodiment 1 illustrates a flowchart of the processing of a first node according to one embodiment of the present disclosure, as shown in FIG. 1. In step 100 illustrated by FIG. 1, each box represents a step. In Embodiment 1, the first node in the present disclosure first performs step 101 to transmit a first sequence and a first radio signal; then in step 102, receives a second radio signal; the first sequence is associated with the first radio signal; the first radio signal comprises a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

In one embodiment, the first sequence is transmitted on a Random Access Channel (RACH).

In one embodiment, the first sequence is transmitted on a Physical Random Access Channel (PRACH).

In one embodiment, the first sequence is transmitted on a Narrowband Physical Random Access Channel (NPRACH).

In one embodiment, the first sequence is transmitted on sidelink.

In one embodiment, the first sequence is cell-specific.

In one embodiment, the first sequence is UE-specific.

In one embodiment, the first sequence is broadcast.

In one embodiment, the first sequence is groupcast.

In one embodiment, the first sequence is unicast.

In one embodiment, the first sequence is a pseudo-random sequence.

In one embodiment, the first sequence is a Gold sequence.

In one embodiment, the first sequence is an M sequence.

In one embodiment, the first sequence is a Zadeoff-Chu sequence.

In one embodiment, the first sequence is a preamble sequence.

In one embodiment, the generation method of the first sequence refers to 3GPP TS38. 211, section 6.3.3.1.

In one embodiment, a Subcarrier Spacing (SCS) of subcarriers occupied by the first sequence in frequency domain is one of 1.25 kHz, 5 kHz, 15 kHz, 30 kHz, 60 kHz or 120 kHz.

In one embodiment, the first sequence is a long preamble.

In one embodiment, the first sequence is a short preamble.

In one embodiment, a length of the first sequence is 839, an SCS of subcarriers occupied by the first sequence is one of 1.25 kHz or 5 kHz.

In one embodiment, a length of the first sequence is 139, an SCS of subcarriers occupied by the first sequence is one of 15 kHz, 30 kHz, 60 kHz or 120 kHz.

In one embodiment, the first sequence is processed through Discrete Fourier Transform (DFT), and then through Orthogonal Frequency Division Multiplexing (OFDM) modulation.

In one embodiment, a first characteristic sequence is obtained after the first sequence sequentially through Sequence Generation, DFT, Modulation and Resource Element Mapping, and Wideband Symbol Generation.

In one embodiment, the first characteristic radio signal is transmitted on an RACH.

In one embodiment, the first characteristic radio signal is transmitted on a PRACH.

In one embodiment, the first characteristic radio signal is transmitted on an NPRACH.

In one embodiment, the first characteristic radio signal comprises at least one first-type sequence, the first sequence is one of the at least one first-type sequence, a length of any of the at least one first-type sequence is 139, and the at least one first-type sequence is Time-Division Multiplexing (TDM).

In one embodiment, the at least one first-type sequence is(are) the same.

In one embodiment, at least two of the at least one first-type sequence are different.

In one embodiment, any two adjacent first-type sequences in the at least one first-type sequence are spaced by a Cyclic Prefix (CP).

In one embodiment, the first radio signal is transmitted on an Uplink Shared Channel (UL-SCH).

In one embodiment, the first radio signal is transmitted on a Physical Uplink Shared Channel (PUSCH).

In one embodiment, the first radio signal is transmitted on a Physical Sidelink Shared Channel (PSSCH).

In one embodiment, the first radio signal is transmitted on a Physical Uplink Control Channel (PUCCH).

In one embodiment, the first radio signal is transmitted on a Physical Sidelink Control Channel (PSCCH).

In one embodiment, the first radio signal is transmitted on a PUCCH and a PUSCH.

In one embodiment, the first radio signal is transmitted on a PSCCH and a PSSCH.

In one embodiment, the first sequence and the first radio signal are respectively transmitted on a PRACH and a PUSCH.

In one embodiment, the first radio signal is Cell-specific.

In one embodiment, the first radio signal is UE-specific.

In one embodiment, the first sequence is cell-specific, and the first radio signal is UE-specific.

In one embodiment, the first sequence and the first radio signal are both UE-specific.

In one embodiment, the first radio signal is broadcast.

In one embodiment, the first radio signal is groupcast.

In one embodiment, the first radio signal is unicast.

In one embodiment, the first radio signal comprises all or part of a higher layer signaling.

In one embodiment, the first radio signal comprises all or part of a Radio Resource Control (RRC) layer signaling.

In one embodiment, the first radio signal comprises one or more fields in an RRC Information Element (IE).

In one embodiment, the first radio signal comprises all or part of a Multimedia Access Control (MAC) layer signaling.

In one embodiment, the first radio signal comprises one or more fields in a MAC Control Element (CE).

In one embodiment, the first radio signal comprises one or more fields in a PHY layer.

In one embodiment, the first radio signal comprises one or more fields in a piece of Uplink Control Information (UCI).

In one embodiment, the first radio signal comprises one or more fields in a Master Information Block-V2X-Sidelink (MIB-V2X-SL).

In one embodiment, the first radio signal comprises one or more fields in a piece of Sidelink Control Information (SCI).

In one embodiment, the first radio signal comprises a Demodulation Reference Signal (DMRS).

In one embodiment, the first radio signal does not comprise a DMRS.

In one embodiment, the first radio signal comprises a first bit block, and the first bit block comprises at least one bit arranged in order.

In one embodiment, the first bit block comprises at least one Code Block (CB).

In one embodiment, the first bit block comprises at least one Code Block Group (CBG).

In one embodiment, the first bit block comprises one Transport Block (TB).

In one embodiment, the first bit block is obtained by a TB subjected to transport block-level Cyclic Redundancy Check (CRC) attachment.

In one embodiment, the first bit block is one of CB(s) obtained by a TB sequentially subjected to TB-level CRC attachment, CB Segmentation, and CB-level CRC attachment.

In one embodiment, the first radio signal is obtained after all or partial bits of the first bit block are sequentially subjected to TB-level CRC attachment, CB segmentation, CB-level CRC attachment, Channel Coding, Rate Matching, CB Concatenation, scrambling, Modulation, Layer Mapping, Antenna Port Mapping, Mapping to Physical Resource Blocks, Baseband Signal Generation, Modulation and Upconversion.

In one embodiment, the Channel Coding is based on a polar code.

In one embodiment, the Channel Coding is based on a Low-density Parity-Check (LDPC) code.

In one embodiment, only the first bit block is used to generate the first radio signal.

In one embodiment, there exists a bit block other than the first bit block also being used to generate the first radio signal.

In one embodiment, the first radio signal does not comprise UCI.

In one embodiment, the first radio signal does not comprise SCI.

In one embodiment, an SCS of subcarriers occupied by the first radio signal in frequency domain is equal to one of 15 kHz, 30 kHz, 60 kHz, 120 kHz, 240 kHz, 480 kHz or 960 kHz.

In one embodiment, a number of multicarrier symbols comprised in the first radio signal in time domain is one of 1 multicarrier symbol, 2 multicarrier symbols, 3 multicarrier symbols, 4 multicarrier symbols, 5 multicarrier symbols, 6 multicarrier symbols, 7 multicarrier symbols, 11 multicarrier symbols, 12 multicarrier symbols, 13 multicarrier symbols or 14 multicarrier symbols.

In one embodiment, the first sequence and the first radio signal are TDM.

In one embodiment, the first characteristic radio signal and the first radio signal are TDM.

In one embodiment, the first radio signal is used to determine the first sequence out of at least one characteristic sequence, and the first sequence is one of the at least one characteristic sequence.

In one embodiment, a payload size of the first radio signal is used to determine the first sequence out of the at least one characteristic sequence, and the first sequence is one of the at least one characteristic sequence.

In one embodiment, a number of bits comprised in the first bit block is used to determine the first sequence out of the at least one characteristic sequence, and the first sequence is one of the at least one characteristic sequence.

In one embodiment, time-frequency resources occupied by the first radio signal are used to determine the first sequence.

In one embodiment, time-frequency resources occupied by the first radio signal are used to determine time-frequency resources occupied by the first sequence.

In one embodiment, the first sequence is used to determine time-frequency resources occupied by the first radio signal.

In one embodiment, the first sequence is used to determine a first time-frequency resource pool, the first time-frequency resource pool comprises at least one time-frequency resource block, time-frequency resources occupied by the first radio signal comprise a first time-frequency resource block, and the first time-frequency resource block is one of the at least one time-frequency resource block.

In one embodiment, a root sequence of the first sequence is used to determine the first time-frequency resource pool.

In one embodiment, a cyclic shift of the first sequence based on a root sequence is used to determine the first time-frequency resource pool.

In one embodiment, time-frequency resources occupied by the first sequence are used to determine the first time-frequency resource pool.

In one embodiment, time-frequency resources occupied by the first sequence are used to determine the first time-frequency resource pool, and a root sequence of the first sequence is used to determine the first time-frequency resource block in the first time-frequency resource pool.

In one embodiment, time-frequency resources occupied by the first characteristic radio signal are used to determine the first time-frequency resource pool.

In one embodiment, the first sequence is used to determine time-domain resources occupied by the first radio signal.

In one embodiment, the first sequence is used to determine frequency-domain resources occupied by the first radio signal.

In one embodiment, the first sequence is used to determine time-domain resources occupied by the first radio signal and frequency-domain resources occupied by the first radio signal.

In one embodiment, the first sequence is associated with time-domain resources occupied by the first radio signal.

In one embodiment, time-domain resources occupied by the first sequence are associated with time-domain resources occupied by the first radio signal.

In one embodiment, time-domain resources occupied by the first characteristic radio signal are used to determine time-domain resources occupied by the first radio signal.

In one embodiment, a root sequence of the first sequence is used to determine the time-domain resources occupied by the first radio signal.

In one embodiment, time-domain resources occupied by the first radio signal and time-domain resources occupied by the first sequence are spaced by a time offset.

In one embodiment, time-domain resources occupied by the first radio signal and time-domain resources occupied by the first characteristic radio signal are spaced by a first time offset.

In one embodiment, the first time offset is pre-defined.

In one embodiment, the first time offset is configured.

In one embodiment, the first time offset comprises at least one subframe.

In one embodiment, the first time offset comprises at least one slot.

In one embodiment, the first time offset comprises at least one multicarrier symbol.

In one embodiment, the first sequence is associated with frequency-domain resources occupied by the first radio signal.

In one embodiment, a root sequence of the first sequence is used to determine frequency-domain resources occupied by the first radio signal.

In one embodiment, a cyclic shift of the first sequence based on a root sequence is used to determine frequency-domain resources occupied by the first radio signal.

In one embodiment, frequency-domain resources occupied by the first sequence is used to determine frequency-domain resources occupied by the first radio signal.

In one embodiment, frequency-domain resources occupied by the first sequence belong to frequency-domain resources occupied by the first radio signal.

In one embodiment, frequency-domain resources occupied by the first sequence are associated with frequency-domain resources occupied by the first radio signal.

In one embodiment, a lowest subcarrier in frequency-domain resources occupied by the first sequence is the same as a lowest subcarrier in frequency-domain resources occupied by the first radio signal.

In one embodiment, frequency-domain resources occupied by the first sequence and frequency-domain resources occupied by the first radio signal are spaced by a first frequency offset.

In one embodiment, a lowest subcarrier in frequency-domain resources occupied by the first sequence and a lowest subcarrier in frequency-domain resources occupied by the first radio signal are spaced by a first frequency offset.

In one embodiment, a start resource block in frequency-domain resources occupied by the first sequence and a start resource block in frequency-domain resources occupied by the first radio signal are spaced by a first frequency offset.

In one embodiment, the first frequency offset is pre-defined.

In one embodiment, the first frequency offset is configured.

In one embodiment, the first frequency offset comprises at least one Physical Resource Block (PRB).

In one embodiment, the first frequency offset comprises at least one Precoding Resource block Group (PRG).

In one embodiment, the first frequency offset comprises at least one subcarrier.

In one embodiment, frequency-domain resources occupied by the first characteristic radio signal are used to determine frequency-domain resources occupied by the first radio signal.

In one embodiment, frequency-domain resources occupied by the first characteristic radio signal belong to frequency-domain resources occupied by the first radio signal.

In one embodiment, frequency-domain resources occupied by the first characteristic radio signal are the same as frequency-domain resources occupied by the first radio signal.

In one embodiment, a lowest subcarrier in frequency-domain resources occupied by the first characteristic radio signal is the same as a lowest subcarrier in frequency-domain resources occupied by the first radio signal.

In one embodiment, a start resource block in frequency-domain resources occupied by the first characteristic radio signal is the same as a start resource block in frequency-domain resources occupied by the first radio signal.

In one embodiment, frequency-domain resources occupied by the first characteristic radio signal and frequency-domain resources occupied by the first radio signal are spaced by a first frequency offset.

In one embodiment, a lowest subcarrier in frequency-domain resources occupied by the first characteristic radio signal and a lowest subcarrier in frequency-domain resources occupied by the first radio signal are spaced by a first frequency offset.

In one embodiment, a start resource block in frequency-domain resources occupied by the first characteristic radio signal and a start resource block in frequency-domain resources occupied by the first radio signal are spaced by a first frequency offset.

In one embodiment, the first sequence is used to determine a scrambling sequence of the first radio signal.

In one embodiment, the first sequence is used to determine a timing for receiving the first radio signal.

In one embodiment, the target identifier is used to identify the first node.

In one embodiment, the target identifier is an integer not less than 0 and not greater than $2^{30}$.

In one embodiment, the target identifier is a hexadecimal non-negative integer.

In one embodiment, the target identifier comprises at least one bit.

In one embodiment, the target identifier comprises at least one hexadecimal bit.

In one embodiment, the target identifier comprises 4 hexadecimal bits.

In one embodiment, the target identifier comprises a value from hexadecimal 0000 to hexadecimal FFFF.

In one embodiment, the target identifier is a Cell Radio Network Temporary Identifier (C-RNTI).

In one embodiment, the target identifier is a Temporary Cell Radio Network Temporary Identifier (TC-RNTI).

In one embodiment, the target identifier is a Radio Network Temporary Identifier (RNTI).

In one embodiment, the target identifier is a Random Access Radio Network Temporary Identifier (RA-RNTI).

In one embodiment, the target identifier is a Paging RNTI (P-RNTI).

In one embodiment, the target identifier is a Serving Temporary Mobile Subscriber Identity (S-TMSI).

In one embodiment, the target identifier is an International Mobile Subscriber Identification Number (IMSI).

In one embodiment, the target identifier is a Globally Unique Temporary UE Identity (GUTI).

In one embodiment, at least one of the first sequence or the first radio signal carries the target identifier.

In one embodiment, the first sequence or the first radio signal are used together to carry the target identifier.

In one embodiment, the first sequence comprises the target identifier.

In one embodiment, the first radio signal comprises the target identifier.

In one embodiment, the first characteristic radio signal comprises the target identifier.

In one embodiment, the first sequence and the first radio signal comprise the target identifier together.

In one embodiment, the first sequence comprises a first sub-target identifier, the first radio signal comprises a second sub-target identifier, and the first sub-target identifier and the second sub-target identifier are used together to determine the target identifier.

In one embodiment, the target identifier is used to determine the first sequence.

In one embodiment, the target identifier is used to determine the first sequence out of at least one characteristic sequence, and the first sequence is one of the at least one characteristic sequence.

In one embodiment, the target identifier is used to generate the first characteristic radio signal.

In one embodiment, the target identifier is used to generate a root sequence of the first sequence.

In one embodiment, the target identifier is used to determine a cyclic shift of the first sequence based on a root sequence.

In one embodiment, the target identifier is used to determine time-domain resources occupied by the first sequence.

In one embodiment, the target identifier is used to determine frequency-domain resources occupied by the first sequence.

In one embodiment, the target identifier is used to determine time-frequency resources occupied by the first sequence.

In one embodiment, the first bit block comprises the target identifier.

In one embodiment, the target identifier is used to generate the first bit block.

In one embodiment, the target identifier is used to generate a scrambling sequence of the first radio signal.

In one embodiment, the target identifier is used to determine time-domain resources occupied by the first radio signal.

In one embodiment, the target identifier is used to determine frequency-domain resources occupied by the first radio signal.

In one embodiment, the target identifier is used to determine time-frequency resources occupied by the first radio signal.

In one embodiment, the target identifier is used to determine time-frequency resource(s) occupied by the first radio signal out of at least one of time-frequency resource.

In one embodiment, the target identifier is used to generate at least one of the first sequence or the first radio signal.

In one embodiment, the target identifier is used to generate the first sequence and the first radio signal.

In one embodiment, the target identifier is used to determine at least one of time-frequency resources occupied by the first sequence or time-frequency resources occupied by the first radio signal.

In one embodiment, the target identifier is used to determine time-frequency resources occupied by the first sequence and time-frequency resources occupied by the first radio signal.

In one embodiment, the target identifier is used to determine at least one of the first sequence, the first radio signal, time-frequency resources occupied by the first sequence or time-frequency resources occupied by the first radio signal.

In one embodiment, the second radio signal is transmitted on a Downlink Shared Channel (DL-SCH).

In one embodiment, the second radio signal is transmitted on a Physical Downlink Shared Channel (PDSCH).

In one embodiment, the second radio signal is transmitted on a Physical Sidelink Shared Channel (PSSCH).

In one embodiment, the second radio signal is transmitted on a Physical Downlink Control Channel (PDCCH).

In one embodiment, the second radio signal is transmitted on a Physical Sidelink Control Channel (PSCCH).

In one embodiment, the second radio signal is cell-specific.

In one embodiment, the second radio signal is UE-specific.

In one embodiment, the second radio signal is broadcast.

In one embodiment, the second radio signal is groupcast.

In one embodiment, the second radio signal is unicast.

In one embodiment, the second radio signal comprises all or part of a higher-layer signaling.

In one embodiment, the second radio signal comprises all or part of an RRC layer signaling.

In one embodiment, the second radio signal comprises one or more fields in an RRC IE.

In one embodiment, the second radio signal comprises all or part of a MAC layer signaling.

In one embodiment, the second radio signal comprises one or more fields of a MAC CE.

In one embodiment, the second radio signal comprises a Multimedia Access Control Protocol Data Unit (MAC PDU).

In one embodiment, the second radio signal is a MAC PDU.

In one embodiment, the second radio signal comprises one or more fields of a PHY layer.

In one embodiment, the second radio signal does not comprise Downlink Control Information (DCI).

In one embodiment, the second radio signal does not comprise SCI.

In one embodiment, the second radio signal comprises a DMRS.

In one embodiment, the second radio signal does not comprise a DMRS.

In one embodiment, an SCS of subcarriers occupied by the second radio signal in frequency domain is equal to one of 15 kHz, 30 kHz, 60 kHz, 120 kHz, 240 kHz, 480 kHz or 960 kHz.

In one embodiment, the second radio signal comprises all or part of information of a Random Access Response (RAR).

In one embodiment, the second radio signal is an RAR.

In one embodiment, the second radio signal comprises a second bit block, and the second bit block comprises at least one bit arranged in order.

In one embodiment, the second bit block comprises at least one CB.

In one embodiment, the second bit block comprises at least one CBG.

In one embodiment, the second bit block comprises a TB.

In one embodiment, the second bit block is obtained by a TB subjected to TB-level CRC attachment.

In one embodiment, the second bit block is one of CB(s) obtained by a TB sequentially subjected to TB-level CRC attachment, CB Segmentation, and CB-level CRC attachment.

In one embodiment, the second radio signal is obtained after all or partial bits of the second bit block are sequentially subjected to TB-level CRC attachment, CB Segmentation, CB-level CRC attachment, Channel Coding, Rate Matching, CB Concatenation, scrambling, modulation, Layer Mapping, Antenna Port Mapping, Mapping to Physical Resource Blocks, Baseband Signal Generation as well as Modulation and Upconversion.

In one embodiment, only the second bit block is used to generate the second radio signal.

In one embodiment, there exists a bit block other than the second bit block being used to generate the second radio signal.

In one embodiment, the second radio signal comprises the first information block.

In one embodiment, the first information block comprises at least one bit arranged in order, and the second bit block comprises all bits in the first information block.

In one embodiment, the first information block comprises at least one bit arranged in order, and the second bit block comprises partial bits in the first information block.

In one embodiment, the first information block comprises all or part of a higher layer signaling.

In one embodiment, the first information block comprises all or part of an RRC layer signaling.

In one embodiment, the first information block comprises all or part of a MAC layer signaling.

In one embodiment, the first information block comprises one or more fields of a MAC CE.

In one embodiment, the first information block comprises one or more fields of a PHY layer.

In one embodiment, the first information block comprises a Multimedia Access Control subheader (MAC subheader).

In one embodiment, the first information block is a MAC subheader.

In one embodiment, the first information block belongs to a Multimedia Access Control sub Protocol Data Unit (MAC subPDU).

In one embodiment, the first information block comprises at least one bit arranged in order.

In one embodiment, the first information block comprises at least one fourth-type field.

In one embodiment, the at least one fourth-type field are arranged in order in the first information block, and numbers of bits comprised in at least two of the at least one fourth-type fields are different.

In one embodiment, the first information block comprises 3 fourth-type fields arranged in order.

In one embodiment, the second radio signal comprises the first information block and the second information block.

In one embodiment, the second radio signal comprises the first information block and does not comprise the second information block.

In one embodiment, the second radio signal also comprises an information block other than the first information block and the second information block.

In one embodiment, the second radio signal comprises a fourth information block, and the fourth information is different from the first information block and the second information block.

In one embodiment, the second information block comprises all or part of a higher layer signaling.

In one embodiment, the second information block comprises all or part of an RRC layer signaling.

In one embodiment, the second information block comprises all or part of a MAC layer signaling.

In one embodiment, the second information block comprises one or more fields of a MAC CE.

In one embodiment, the second information block comprises one or more fields of a PHY layer.

In one embodiment, the second information block comprises a Multimedia Access Control Payload (MAC payload).

In one embodiment, the second information block is a MAC payload.

In one embodiment, the second information block belongs to a MAC subPDU.

In one embodiment, the second information block comprises at least one bit arranged in order.

In one embodiment, the second information block comprises at least one fifth-type field.

In one embodiment, the at least one fifth-type fields are arranged in order in the second information block, and numbers of bits comprised in at least two of the at least one fifth-type fields are different.

In one embodiment, the first field is one of at least one fourth-type field comprised in the first information block.

In one embodiment, the first field comprises at least one bit.

In one embodiment, the first field only comprises one bit.

In one embodiment, the first field is used to determine whether the second radio signal comprises the second information block.

In one embodiment, the first field is used to indicate any one of at least one first-type state, a first state is one of at least one first-type state, a second state is one of at least one first-type state, and the second state is different from the first state; when the first field indicates the first state, the second radio signal does not comprise the second information block; and when the first field indicates the second state, the second radio signal does not comprise the second information block.

In one embodiment, the first field is used to indicate any one of at least one first-type state, a first state is one of at least one first-type state, a second state is one of at least one first-type state, and the second state is different from the first state; when the first field indicates a first state, the second radio signal does not comprise the second information block; and when the first field indicates a second state, the second radio signal comprises the second information block.

In one embodiment, the first field is used to indicate any one of at least one first-type state; when the first field indicates a first state, the first state is one of at least one first-type state, and the second radio signal does not comprise the second information block; when the first field indicates a second state, the second state is one of at least one first-type state, the second state is different from the first state, and the second radio signal comprises the second information block.

In one embodiment, the first field is used to indicate any one of at least one first-type state, a first state is one of at least one first-type state, a second state is one of at least one first-type state, and the second state is different from the first state; when the first field indicates a first state, the second radio signal does not comprise the second information block; and when the first field indicates a second state, the second field is used to determine whether the second radio signal comprises the second information block.

In one embodiment, the first field only comprises one bit, the first field is set to "1", and the first field indicates the first state.

In one embodiment, the first field only comprises one bit, the first field is set to "0", and the first field indicates the second state.

In one embodiment, the first field comprises two bits, the first field is set to "11", and the first field indicates the first state.

In one embodiment, the first field comprises two bits, the first field is set to "00", and the first field indicates the second state.

In one embodiment, the second field is one of at least one fourth-type field comprised in the first information block, and the second field is different from the first field.

In one embodiment, the second field comprises at least one bit.

In one embodiment, the second field is used to determine a first value, and the first value is a non-negative integer.

In one embodiment, the first value is one of the at least one first-type value, and the second field is used to determine the first value out of at least one first-type value.

In one embodiment, the at least one first-type value belongs (belong) to at least one value interval, and a first value interval and a second value interval are two orthogonal value intervals in the at least one value interval.

In one embodiment, the first field indicates the second state, and a value interval to which the first value belongs is used to determine whether the second radio signal comprises the second information block.

In one embodiment, the first field indicates the second state, a value interval to which the first value belongs is the first value interval, and the second radio signal does not comprise the second information block.

In one embodiment, the first field indicates the second state, a value interval to which the first value belongs is the second value interval, and the second radio signal comprises the second information block.

In one embodiment, the first field is set to "0", the first value is set to 14, and the second radio signal comprises the second information block.

In one embodiment, the first field is set to "0", the first value is set to 15, and the second radio signal comprises the second information block.

In one embodiment, the first field is set to "0", the first value is set to any non-negative integer from 0 to 13, and the second radio signal does not comprise the second information block.

In one embodiment, the second information block comprises the first-type identifier, and the target identifier belongs to the first-type identifier.

In one embodiment, the first-type identifier is one of at least one fifth-type field comprised in the second information block.

In one embodiment, a communication system comprises at least one first-type identifier, and the target identifier is one of the at least one first-type identifier.

In one embodiment, a communication network comprises at least one first-type identifier, and the target identifier is one of the at least one first-type identifier.

In one embodiment, a cell comprises at least one first-type identifier, and the target identifier is one of the at least one first-type identifier.

In one embodiment, the second information block comprises at least one of the at least one first-type identifier.

In one embodiment, the second information block only comprises the first-type identifier.

In one embodiment, the target identifier belongs to the first-type identifier.

In one embodiment, the first-type identifier is used to identify a UE.

In one embodiment, the first-type identifier is used to identify a relay node.

In one embodiment, the first-type identifier is an integer not less than 0 and not greater than $2^{30}$.

In one embodiment, the first-type identifier is a hexadecimal non-negative integer.

In one embodiment, the first-type identifier comprises at least one bit.

In one embodiment, the first-type identifier comprises at least one hexadecimal bit.

In one embodiment, the first-type identifier comprises 4 hexadecimal bits.

In one embodiment, the first-type identifier comprises a value from hexadecimal 0000 to hexadecimal FFFF.

In one embodiment, the first-type identifier is a C-RNTI.

In one embodiment, the first-type identifier is a TC-RNTI.

In one embodiment, the first-type identifier is an RNTI.

In one embodiment, the first-type identifier is an RA-RNTI.

In one embodiment, the first-type identifier is a P-RNTI.

In one embodiment, the first-type identifier is an S-TMSI.

In one embodiment, the first-type identifier is an IMSI.

In one embodiment, the first-type identifier is a GUTI.

In one embodiment, the second radio signal comprises the first-type identifier.

In one embodiment, the first-type identifier is used to generate a scrambling sequence of the second radio signal.

In one embodiment, the first-type identifier is used to generate a CRC of the second radio signal.

In one embodiment, the first-type identifier is used to determine a DMRS of the second radio signal.

Embodiment 2

Figure 2:
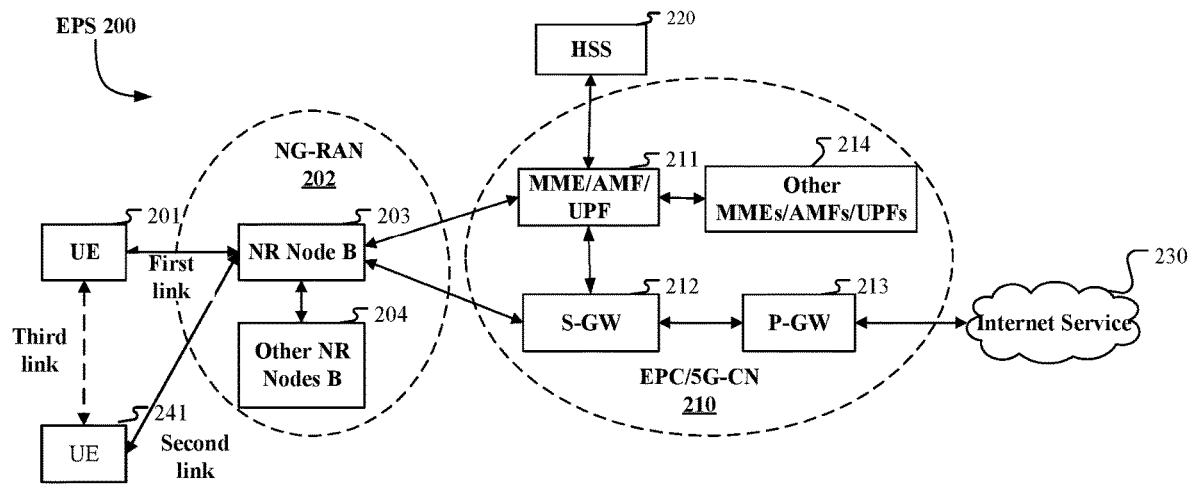
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the second node in the present disclosure comprises the gNB 203.

In one embodiment, the UE in the present disclosure comprises the UE 201.

In one embodiment, the base station in the present disclosure comprises the gNB 203.

In one embodiment, a transmitter of the first sequence in the present disclosure comprises the UE 201.

In one embodiment, a receiver of the first sequence comprises the gNB 203.

In one embodiment, a transmitter of the first radio signal in the present disclosure comprises the UE 201.

In one embodiment, a receiver of the first radio signal in the present disclosure comprises the gNB 203.

In one embodiment, a receiver of the first signaling in the present disclosure comprises the UE 201.

In one embodiment, a transmitter of the first signaling in the present disclosure comprises the gNB 203.

In one embodiment, a receiver of the second radio signal in the present disclosure comprises the UE 201.

In one embodiment, a transmitter of the second radio signal in the present disclosure comprises the gNB 203.

In one embodiment, a receiver of third information block in the present disclosure comprises the UE 201.

In one embodiment, a transmitter of the third information block in the present disclosure comprises the gNB 203.

Embodiment 3

Figure 3:
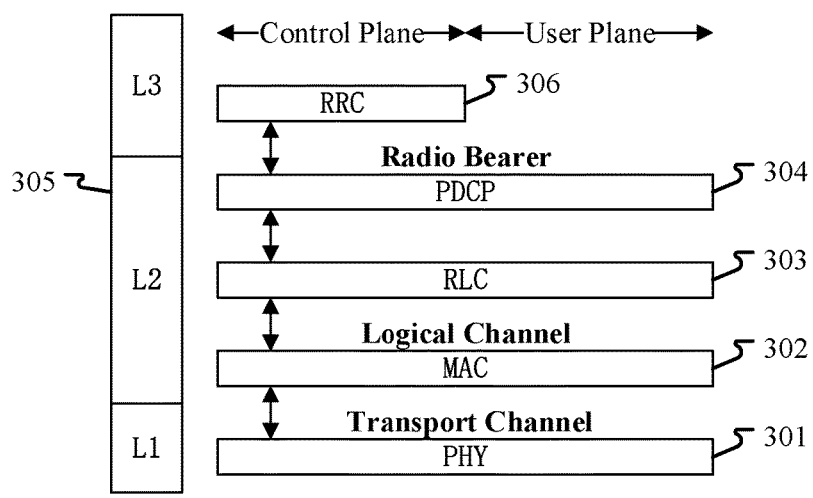
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. A layer above the layer 1 belongs to a higher layer. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base stations of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead, provides security by encrypting a packet, and provides support for UE handover between base stations. The RLC sublayer 303 provides segmentation and reassembling of a higher-layer packet, retransmission of a lost packet, and reordering of a packet so as to compensate the disordered receiving caused by Hybrid Automatic Repeat reQuest (HARD). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the base station is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for obtaining radio resources (i.e., radio bearer) and configuring the lower layer using an RRC signaling between the base station and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first sequence in the present disclosure is generated by the PHY 301.

In one embodiment, the first radio signal in the present disclosure is generated by the RRC sublayer 306.

In one embodiment, the first radio signal in the present disclosure is generated by the MAC sublayer 302.

In one embodiment, the first radio signal in the present disclosure is generated by the PHY 301.

In one embodiment, the first signaling in the present disclosure is generated by the PHY 301.

In one embodiment, the second radio signal in the present disclosure is generated by the RRC sublayer 306.

In one embodiment, the second radio signal in the present disclosure is generated by the MAC sublayer 302.

In one embodiment, the second radio signal in the present disclosure is generated by the PHY 301.

In one embodiment, the first information block in the present disclosure is generated by the MAC sublayer 302.

In one embodiment, the second information block in the present disclosure is generated by the MAC sublayer 302.

In one embodiment, the third information block in the present disclosure is generated by the RRC sublayer 306.

Embodiment 4

Figure 4:
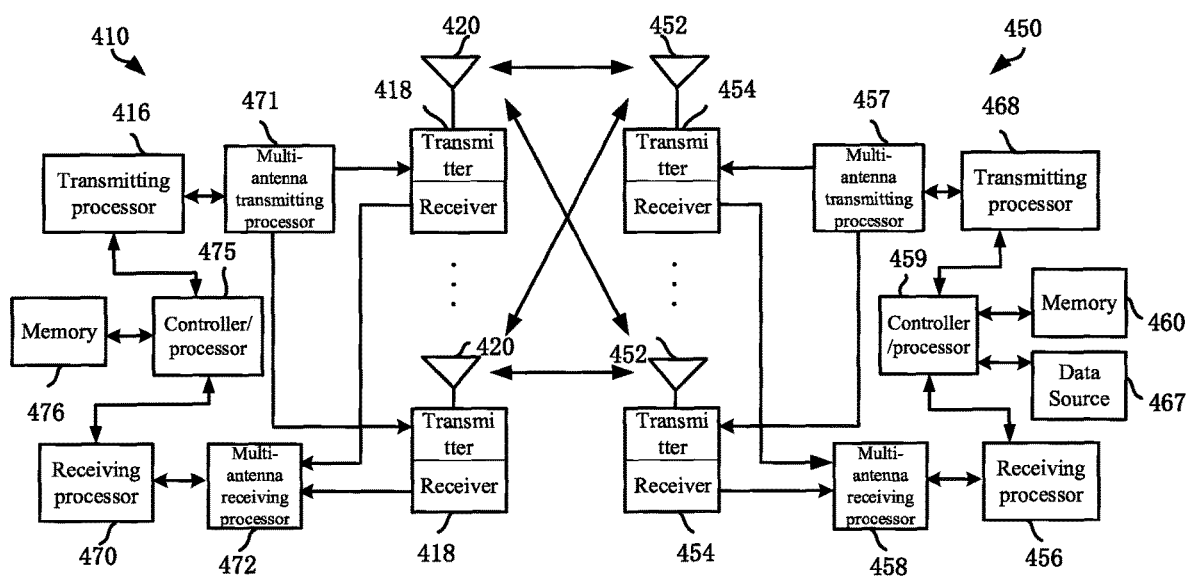
FIG. 4 illustrates a schematic diagram of a first node and a second node according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a base station.

In one subembodiment of the above embodiment, the first node is a UE, and the second node is a relay node.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one subembodiment of the above embodiment, the first communication device 410 comprises: at least one controller/processor; the at least one controller/processor is responsible for HARQ operation.

In one subembodiment of the above embodiment, the second communication device 450 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: transmits a first sequence and a first radio signal, the first sequence is associated with the first radio signal; and receives a second radio signal; the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

In one embodiment, the second communication device 450 comprises a memory that stores a computer readable instruction program. The computer readable instruction program generates an action when executed by at least one processor. The action includes: transmitting a first sequence and a first radio signal, the first sequence being associated with the first radio signal; and receiving a second radio signal; the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: receives a first sequence and a first radio signal, the first sequence is associated with the first radio signal; and transmits a second radio signal; the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

In one embodiment, the first communication device 410 comprises a memory that stores a computer readable instruction program. The computer readable instruction program generates an action when executed by at least one processor. The action includes: receiving a first sequence and a first radio signal, the first sequence being associated with the first radio signal; and transmitting a second radio signal; the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

In one embodiment, at least one of the antenna 452, the transmitter 454, the multi-antenna transmitting processor 458, the transmitting processor 468, the controller/processor 459, the memory 460, or the data sources 467 is used to transmit the first sequence in the present disclosure.

In one embodiment, at least one of the antenna 452, the transmitter 454, the multi-antenna transmitting processor 458 or the transmitting processor 468 is used to transmit the first sequence in the present disclosure.

In one embodiment, at least one of the antenna 452, the transmitter 454, the multi-antenna transmitting processor 458, the transmitting processor 468, the controller/processor 459, the memory 460, or the data sources 467 is used to transmit the first radio signal in the present disclosure.

In one embodiment, at least one of the antenna 452, the transmitter 454, the multi-antenna transmitting processor 458 or the transmitting processor 468 is used to transmit the first radio signal in the present disclosure.

In one embodiment, at least one of the antenna 452, the receiver 454, the multi-antenna receiving processor 458, the receiving processor 456, the controller/processor 459, the memory 460, or the data source 467 is used to receive the first signaling in the present disclosure.

In one embodiment, the antenna 452, the receiver 454, the multi-antenna receiving processor 458, the receiving processor 456, the controller/processor 459, the memory 460, and the data source 467 are used to receive the first signaling in the present disclosure.

In one embodiment, at least one of the antenna 452, the receiver 454, the multi-antenna receiving processor 458, the receiving processor 456, the controller/processor 459, the memory 460, or the data source 467 is used to receive the second radio signal in the present disclosure.

In one embodiment, the antenna 452, the receiver 454, the multi-antenna receiving processor 458, the receiving processor 456, the controller/processor 459, the memory 460, and the data source 467 are used to receive the second radio signal in the present disclosure.

In one embodiment, at least one of the antenna 452, the receiver 454, the multi-antenna receiving processor 458, the receiving processor 456, the controller/processor 459, the memory 460, or the data source 467 is used to receive the third information block in the present disclosure.

In one embodiment, the antenna 452, the receiver 454, the multi-antenna receiving processor 458, the receiving processor 456, the controller/processor 459, the memory 460, and the data source 467 are used to receive the third information block in the present disclosure.

Embodiment 5

Figure 5:
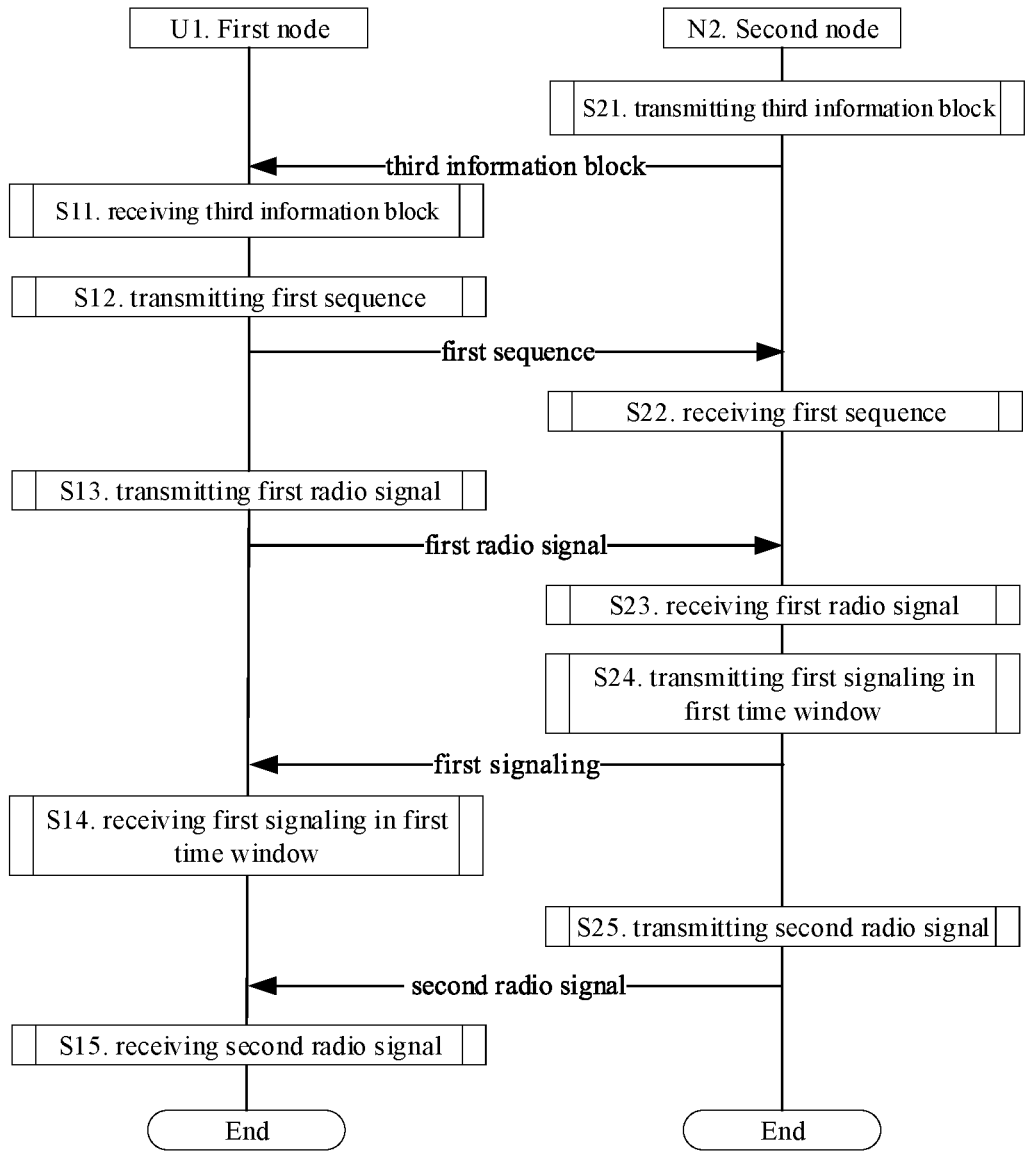
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a first node U1 and a second node N2 are communication nodes that are transmitted via an air interface. In FIG. 5, steps in dotted box F0 are optional.

The first node U1 receives a third information block in step S11; transmits a first sequence in step S12; transmits a first radio signal in step S13; receives a first signaling in a first time window in step S14; and receives a second radio signal in step S15.

The second node N2 transmits a third information block in step S21; receives a first sequence in step S22; receives a first radio signal in step S23; transmits a first signaling in a first time window in step S24; and transmits a second radio signal in step S25.

In Embodiment 5, the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier; the first field and a value interval to which the first value belongs are used to determine an information format of the second information block; the second radio signal comprises Y second-type information block(s), and the second information block is one of the Y second-type information block(s), Y being a positive integer; the Y second-type information block(s) comprises (respectively comprise) Y first-type identifier(s); when the target identifier is one of the Y first-type identifier(s), the Y second-type information block(s) comprises (comprise) a second-type target information block, and the second-type information block is one of the Y second-type information block(s) corresponding to the target identifier; the second radio signal comprises X first-type information block(s), and the first information block is one of the X first-type information block(s), X being a positive integer; the X first-type information block(s) comprises (respectively comprise) X first-type field(s), the first field is one of the X first-type field(s), a position of the first information block in the X first-type information block (s) is used to determine whether the first field is used to determine whether the second radio signal comprises the Y second-type information block(s); the first signaling is used to determine at least one of time-frequency resources occupied by the second radio signal or an MCS adopted by the second radio signal; at least one of air-interface resources occupied by the first sequence or air-interface resources occupied by the first radio signal are used to determine a start time of the first time window; the third information block is used to determine a time length of a first time window.

In one embodiment, a value interval to which the first value belongs is a first value interval.

In one embodiment, a value interval to which the first value belongs is a second value interval.

In one embodiment, the first value interval is different from the second value interval.

In one embodiment, an illegal communication node assumes that the first value only belongs to the first value interval out of the first value interval and the second value interval.

In one embodiment, the first signaling is used to determine time-frequency resources occupied by the second radio signal.

In one embodiment, the first signaling is used to determine an MCS adopted by the second radio signal.

In one embodiment, the first signaling is used to determine time-frequency resources occupied by the second radio signal and an MCS adopted by the second radio signal.

In one embodiment, the second node N2 is a maintenance base station of a serving cell of a first node U1.

In one embodiment, the second node N2 is an access base station of a serving cell of a first node U1.

In one embodiment, the first signaling is transmitted through a PDCCH.

In one embodiment, the first signaling and the second radio signal are respectively transmitted on a PDCCH and a PDSCH.

In one embodiment, the first signaling and the second radio signal are respectively transmitted on a PSCCH and a PSSCH.

In one embodiment, the first signaling is broadcast.

In one embodiment, the first signaling is groupcast.

In one embodiment, the first signaling is unicast.

In one embodiment, the first signaling is cell-specific.

In one embodiment, the first signaling is UE-specific.

In one embodiment, the first signaling is semi-statically configured.

In one embodiment, the first signaling is dynamically configured.

In one embodiment, the first signaling comprises all or part of a higher-layer signaling.

In one embodiment, the first signaling comprises one or more fields of a PHY layer signaling.

In one embodiment, the first signaling comprises one or more fields in a piece of DCI.

In one embodiment, the first signaling comprises one or more fields in a DCI format.

In one embodiment, the first signaling comprises one or more fields in a piece of SCI.

In one embodiment, the first signaling is a piece of DCI.

In one embodiment, the first signaling is a DCI format.

In one embodiment, the first signaling is DCI format 1_0 in NR system.

In one embodiment, the first signaling comprises a first characteristic identifier.

In one embodiment, the first signaling carries a first characteristic identifier.

In one embodiment, the first characteristic identifier is used to scramble the first signaling.

In one embodiment, the first characteristic identifier is used to generate a scrambling sequence of the first signaling.

In one embodiment, the first characteristic identifier is used to generate a DMRS of the first signaling.

In one embodiment, the first characteristic identifier is used to generate a CRC of the first signaling.

In one embodiment, the first characteristic identifier is a hexadecimal non-negative integer.

In one embodiment, the first characteristic identifier comprises 4 hexadecimal bits.

In one embodiment, the first characteristic identifier comprises a value from hexadecimal 0000 to hexadecimal FFFF.

In one embodiment, the first characteristic identifier is an RNTI.

In one embodiment, the first characteristic identifier is an RA-RNTI.

In one embodiment, the first characteristic identifier is a C-RNTI.

In one embodiment, the first characteristic identifier is a TC-RNTI.

In one embodiment, the first characteristic identifier is an S-TMSI.

In one embodiment, the first characteristic identifier is an IMSI.

In one embodiment, the first characteristic identifier is a GUTI.

In one embodiment, the first characteristic identifier is not the target identifier.

In one embodiment, the first characteristic identifier and the target identifier are respectively two different RNTIs.

In one embodiment, the target identifier is a TC-RNTI, and the first characteristic identifier is an RA-RNTI.

In one embodiment, the target identifier is a C-RNTI, and the first characteristic identifier is an RA-RNTI.

In one embodiment, the target identifier is an S-TMSI, and the first characteristic identifier is an RNTI.

In one embodiment, the target identifier is an S-TMSI, and the first characteristic identifier is an RA-RNTI.

In one embodiment, time-domain resources occupied by the first sequence is used to determine the first characteristic identifier.

In one embodiment, frequency-domain resources occupied by the first sequence is used to determine the first characteristic identifier.

In one embodiment, time-frequency resources occupied by the first sequence is used to determine the first characteristic identifier.

In one embodiment, time-domain resources occupied by the first sequence and frequency-domain resources occupied by the first sequence are used together to determine the first characteristic identifier.

In one embodiment, time-domain resources occupied by the first radio signal are used to determine the first characteristic identifier.

In one embodiment, frequency-domain resources occupied by the first radio signal are used to determine the first characteristic identifier.

In one embodiment, time-frequency resources occupied by the first radio signal are used to determine the first characteristic identifier.

In one embodiment, time-frequency resources occupied by the first sequence and time-frequency resources occupied by the first radio signal are used together to determine the first characteristic identifier.

In one embodiment, the first RACH occasion is used to determine the first characteristic identifier.

In one embodiment, the first RACH occasion is used to determine the first characteristic identifier out of at least one first-type characteristic identifier, and the first characteristic identifier is one of the at least one first-type characteristic identifier.

The first characteristic identifier is equal to a sum of a positive integer, a symbol index of a first multicarrier symbol of time-domain resources occupied by a PRACH, a multiple of a slot index of time-domain resources occupied by a PRACH, a multiple of a frequency index of frequency resources occupied by a PRACH and a multiple of an uplink carrier index.

In one embodiment, the first characteristic identifier is equal to (1+a symbol index of a first multicarrier symbol of time-domain resources occupied by a PRACH+14×a slot index of time-domain resources occupied by a PRACH+14× 80×a frequency index of frequency-domain resources occupied by a PRACH+14×80×8×an uplink carrier index).

In one embodiment, the characteristic identifier is used to generate the first signaling.

In one embodiment, the first characteristic identifier is used to scramble the first signaling.

In one embodiment, the first characteristic identifier is used to generate a CRC of the first signaling.

In one embodiment, the first characteristic identifier is used to generate the second radio signal.

In one embodiment, the first characteristic identifier is used to scramble the second radio signal.

In one embodiment, the first characteristic identifier is used to generate a CRC of the second radio signal.

In one embodiment, the first characteristic identifier is used to generate a DMRS of the second radio signal.

In one embodiment, the first signaling is used to determine frequency-domain resources occupied by the second radio signal.

In one embodiment, the first signaling is used to determine time-domain resources occupied by the second radio signal.

In one embodiment, the first signaling is used to determine time-domain resources occupied by the second radio signal and frequency-domain resources occupied by the second radio signal.

In one embodiment, the first signaling comprises time-frequency resources occupied by the second radio signal.

In one embodiment, the first signaling comprises an MCS adopted by the second radio signal.

In one embodiment, the first signaling comprises time-frequency resources occupied by the second radio signal and an MCS adopted by the second radio signal.

In one embodiment, the first signaling comprises a DMRS adopted by the second radio signal.

In one embodiment, the first signaling comprises an Antenna Port (AP) corresponding to a DMRS adopted by the second radio signal.

In one embodiment, the first signaling is used to determine transmit power adopted by the second radio signal.

In one embodiment, the first signaling is used to determine a number of all bits comprised in the second bit block.

In one embodiment, the first signaling comprises scheduling information of the second radio signal.

In one embodiment, the first signaling indicates time-frequency resources occupied by the second radio signal.

In one embodiment, the first signaling indicates an MCS adopted by the second radio signal.

In one embodiment, the first signaling indicates a Redundancy Version (RV) adopted by the second radio signal.

In one embodiment, the first signaling indicates time-frequency resources occupied by the second radio signal and an RV adopted by the second radio signal.

In one embodiment, the first signaling indicates an MCS adopted by the second radio signal and an RV adopted by the second radio signal.

In one embodiment, the first signaling indicates time-frequency resources occupied by the second radio signal, an MCS adopted by the second radio signal and an RV adopted by the second radio signal.

In one embodiment, the first signaling comprises at least one third-type field, two of the at least one third-type fields are respectively used to indicate time-frequency resources occupied by the second radio signal and an MCS adopted by the second radio signal.

In one embodiment, the first signaling comprises at least one third-type field, three of the at least one third-type field are respectively used to indicate time-frequency resources occupied by the second radio signal, an MCS adopted by the second radio signal and an RV adopted by the second radio signal.

In one embodiment, a Cyclic Redundancy Check (CRC) code of the first signaling is used to indicate scheduling information of the second radio signal.

In one embodiment, a DMRS of the first signaling is used to indicate scheduling information of the second radio signal.

In one embodiment, the first signaling is used to determine a time interval between a time for receiving the first signaling and a time for receiving the second radio signal.

In one embodiment, the time interval is pre-defined.

In one embodiment, the time interval is configured.

In one embodiment, the time interval comprises at least one subframe.

In one embodiment, the time interval comprises at least one slot.

In one embodiment, the time interval comprises at least one multicarrier symbol.

In one embodiment, the scheduling information comprises time-frequency resources occupied by the second radio signal.

In one embodiment, the scheduling information comprises an MCS adopted by the second radio signal.

In one embodiment, the scheduling information comprises an RV adopted by the second radio signal.

In one embodiment, the scheduling information comprises time-frequency resources occupied by the second radio signal and an MCS adopted by the second radio signal.

In one embodiment, the scheduling information comprises time-frequency resources occupied by the second radio signal and an RV adopted by the second radio signal.

In one embodiment, the scheduling information comprises an MCS adopted by the second radio signal and an RV adopted by the second radio signal.

In one embodiment, the scheduling information comprises time-frequency resources occupied by the second radio signal, an MCS adopted by the second radio signal and an RV adopted by the second radio signal.

In one embodiment, the scheduling information comprises time-frequency resources occupied by the second radio signal, an MCS adopted by the second radio signal, an RV adopted by the second radio signal and an AP of a DMRS adopted by the second radio signal.

In one embodiment, the third information block is transmitted on a PDCCH.

In one embodiment, the third information block is transmitted on a PDSCH.

In one embodiment, the third information block is transmitted on a PDCCH and a PDSCH.

In one embodiment, the third information block is broadcast.

In one embodiment, the third information block is groupcast.

In one embodiment, the third information block is unicast.

In one embodiment, the third information block is cell-specific.

In one embodiment, the third information block is UE-specific.

In one embodiment, the third information block comprises all or part of a higher-layer signaling.

In one embodiment, the third information block comprises all or part of an RRC layer signaling.

In one embodiment, the third information block comprises one or more fields in an RRC IE.

In one embodiment, the third information block comprises one or more fields in a Master Information Block (MIB).

In one embodiment, the third information block comprises one or more fields in a System Information Block (SIB).

In one embodiment, the third information block comprises all or part of a MAC layer signaling.

In one embodiment, the third information block comprises one or more fields of a PHY layer signaling.

In one embodiment, the third information block comprises an ra-ResponseWindow field in a RACH-ConfigGeneric IE in NR system.

In one embodiment, the first time window comprises at least one slot.

In one embodiment, the first time window comprises at least one multicarrier symbol.

In one embodiment, the first time window comprises at least one subframe.

In one embodiment, the first time window comprises at least one radio frame.

In one embodiment, the first time window comprises at least one ms.

In one embodiment, parameters of the first time window comprise one or more of a start time of a first time window, an end time of a first time window and a time length of a first time window.

In one embodiment, a start time of the first time window is a time when the first node starts monitoring the first signaling.

In one embodiment, an end time of the first time window is a latest time when the first node stops monitoring the first signaling.

In one embodiment, a time length of the first time window is a duration from a start time of the first time window to an end time of the first time window.

In one embodiment, a time length of the first time window is an integral multiple of a slot.

In one embodiment, a time length of the first time window is an integral multiple of a multicarrier symbol.

In one embodiment, a time length of the first time window is an integral multiple of a subframe.

In one embodiment, a time length of the first time window is not greater than 10 ms.

In one embodiment, a time length of the first time window is 1 slot.

In one embodiment, a time length of the first time window is 2 slots.

In one embodiment, a time length of the first time window is 4 slots.

In one embodiment, a time length of the first time window is 8 slots.

In one embodiment, a time length of the first time window is 10 slots.

In one embodiment, a time length of the first time window is 20 slots.

In one embodiment, a time length of the first time window is 40 slots.

In one embodiment, a time length of the first time window is 80 slots.

In one embodiment, a time length of the first time window is configured by the third information block.

In one embodiment, the third information block is used to configure a time length of the first time window.

In one embodiment, the third information block comprises a time length of the first time window.

In one embodiment, the third information block comprises at least one field, and a time length of the first time window is one field of the at least one field comprised in the third information block.

In one embodiment, the third information block indicates a time length of the first time window.

In one embodiment, the third information block indicates that a time length of the first time window is one of 1 slot, 2 slots, 4 slots, 8 slots, 10 slots, 20 slots, 40 slots or 80 slots.

Embodiment 6

Figure 6:
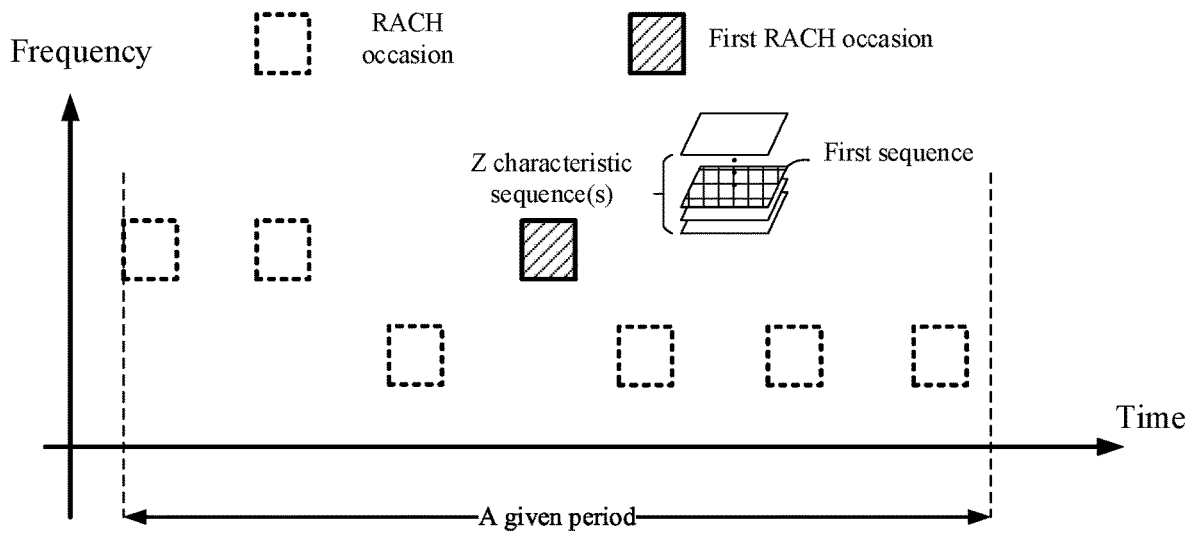
FIG. 6 illustrates a schematic diagram of relations among a given period, a first RACH occasion, a first sequence and Z characteristic sequence(s) according to one embodiment of the present disclosure.

Embodiment 6 illustrates a schematic diagram of relations among a given period, a first RACH Occasion, a first sequence and Z characteristic sequence(s) according to one embodiment of the present disclosure, as shown in FIG. 6. In FIG. 6, the horizontal axis represents time, the vertical axis represents frequency, the dotted rectangle represents at least one RACH occasion in a given period, the slash-filled solid rectangle represents a first RACH occasion, the Z parallelogram(s) represents (respectively represent) Z characteristic sequence(s), and the square-filled parallelogram represents a first sequence.

In Embodiment 6, a given period in the present disclosure comprises at least one RACH occasion, a first RACH occasion is one of the at least one RACH occasion, the first RACH occasion corresponds to Z characteristic sequence(s) in the present disclosure, and the first sequence in the present disclosure is one of the Z characteristic sequence(s), Z being a positive integer.

In one embodiment, the first node transmits the first sequence out of the Z characteristic sequence(s) on the first RACH occasion.

In one embodiment, in a given period, there exists (exist) at least one RACH occasion, and any of the at least one RACH corresponds to Z characteristic sequence(s), Z being a positive integer.

In one embodiment, in a given period, there exists (exist) at least one RACH occasion, and at least one of the at least one RACH corresponds to Z characteristic sequence(s), Z being a positive integer.

In one embodiment, a given period comprises at least one RACH occasion, and any of the at least one RACH occasion corresponds to Z characteristic sequence(s), Z being a positive integer.

In one embodiment, the given period is a Broadcast Channel (BCH) update period.

In one embodiment, the given period comprises at least one radio frame.

In one embodiment, the given period comprises at least one subframe.

In one embodiment, the given period comprises at least one slot.

In one embodiment, the given period is 80 ms.

In one embodiment, the given period is 40 ms.

In one embodiment, the given period is 10 ms.

In one embodiment, any of the at least one RACH occasion is time-frequency resources occupied by the Z characteristic sequence(s).

In one embodiment, any of the at least one RACH occasion is time-frequency resources occupied by a PRACH.

In one embodiment, any of the at least one RACH occasion is time-frequency resources occupied by the first sequence.

In one embodiment, any of the Z characteristic sequence(s) is transmitted on any of the at least one RACH occasion.

In one embodiment, at least one of the Z characteristic sequence(s) is transmitted on any of the at least one RACH occasion.

In one embodiment, any of the Z characteristic sequence(s) is a pseudo-random sequence.

In one embodiment, any of the Z characteristic sequence is a Zadeoff-Chu sequence.

In one embodiment, the Z is a positive integer not greater than 64.

In one embodiment, the Z is equal to 64.

In one embodiment, the first sequence is one of the Z characteristic sequence(s).

In one embodiment, the first sequence is transmitted on any of the at least one RACH occasion.

In one embodiment, the first characteristic radio signal is transmitted on any of the at least one RACH occasion.

In one embodiment, the first radio signal is used to determine the first sequence out of the Z characteristic sequence(s), and the first sequence is one of the Z characteristic sequence(s).

In one embodiment, a payload size of the first radio signal is used to determine the first sequence out of the Z characteristic sequence(s), and the first sequence is one of the Z characteristic sequence(s).

In one embodiment, a number of bits comprised in the first bit block is used to determine the first sequence out of the Z characteristic sequence(s), and the first sequence is one of the Z characteristic sequence(s).

In one embodiment, the second field is used to determine one of the Z characteristic sequence(s).

In one embodiment, the Z characteristic sequence(s) corresponds (correspond) to the first characteristic sequence.

In one embodiment, any of the Z characteristic sequence transmitted in the first RACH time corresponds to the first characteristic identifier.

Embodiment 7

Figure 7:
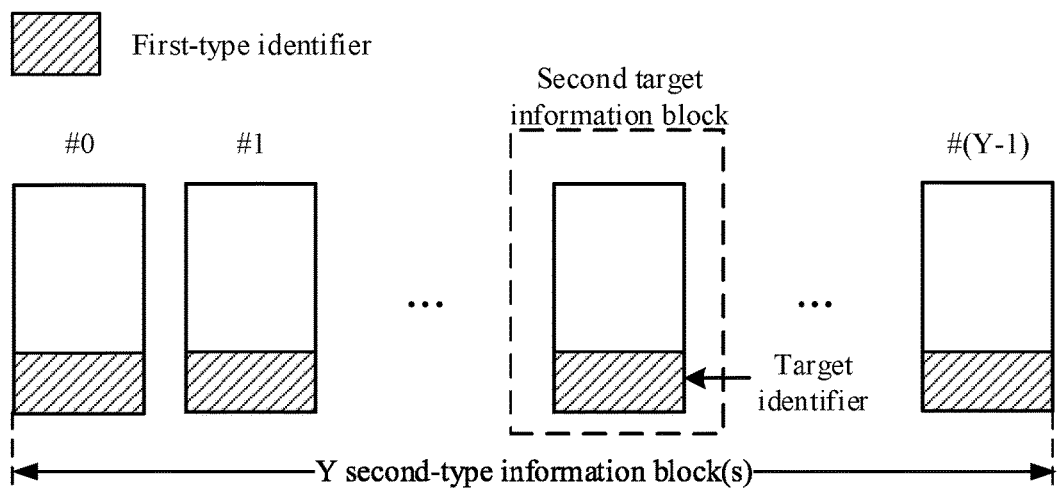
FIG. 7 illustrates a schematic diagram of relations among a target identifier and a second target information block as well as a first-type identifier and Y second-type information block(s) according to one embodiment of the present disclosure.

Embodiment 7 illustrates a schematic diagram of relations among a target identifier, a second target information block and a first-type identifier, Y second-type information block(s) according to one embodiment of the present disclosure, as shown in FIG. 7. In FIG. 7, the solid rectangle represents a second-type information block in the present disclosure, the slash-filled rectangle represent a first-type identifier in the present disclosure, and a dotted rectangle represents a second target information block.

In Embodiment 7, the second radio signal comprises Y second-type information block(s), and the second information block is one of the Y second-type information block(s), Y being a positive integer; the Y second-type information block(s) comprises (respectively comprise) Y first-type identifier(s); when the target identifier is one of the Y first-type identifier(s), the Y second-type information block(s) comprises (comprise) a second target information block, and the second target information block is one of the Y second-type information block(s) corresponding to the target identifier.

In one embodiment, the second radio signal comprises Y second-type information block(s), and the second information block is one of the Y second-type information block(s), Y being a positive integer.

In one embodiment, the Y second-type information block(s) comprises (respectively comprise) Y MAC payload(s).

In one embodiment, the Y second-type information block(s) is (are respectively) Y MAC payload(s).

In one embodiment, any of the Y second-type information block(s) comprises at least one of a Timing Advance Command (TAC), an Uplink Grant (UL Grant), a first-type identifier or a UE Contention Resolution Identity.

In one embodiment, any of the Y second-type information block(s) comprises a TAC.

In one embodiment, a TAC field is a field in any of the Y second-type information block(s).

In one embodiment, the TAC field is used to indicate a timing adjustment index, and the timing adjustment index is used to control a timing adjustment amount needed to be applied by a MAC entity of the first node.

In one embodiment, the TAC field comprises 12 bits.

In one embodiment, at least one of the Y second-type information block(s) comprises an Uplink Grant.

In one embodiment, an Uplink Grant field is a field in at least one of the Y second-type information block(s).

In one embodiment, the Uplink Grant field comprises 25 bits.

In one embodiment, the Uplink Grant field is used to indicate resources transmitted via uplink.

In one embodiment, the Uplink Grant field is used to schedule transmission of an uplink radio signal.

In one embodiment, the Uplink Grant field is used to schedule a PUSCH.

In one embodiment, the Uplink Grant field is used to schedule Msg3 in random access procedure.

In one embodiment, the Uplink Grant field is used to indicate an RAR Uplink Grant.

In one embodiment, the Uplink Grant field comprises a Frequency Hopping Flag.

In one embodiment, the Uplink Grant field comprises frequency-domain resource allocation of a radio signal.

In one embodiment, the Uplink Grant field comprises time-domain resource allocation of a radio signal.

In one embodiment, the Uplink Grant field comprises an MCS of a radio signal.

In one embodiment, the Uplink Grant field comprises a Transmitter Power Control (TPC) command of a radio signal.

In one embodiment, the Uplink Grant field comprises a Channel State Information (CSI) Request.

In one embodiment, the Uplink Grant field comprises at least one of a Frequency Hopping Flag, a PUSCH frequency-domain resource allocation, a PUSCH time-domain resource allocation, an MCS, a TPC command or a CSI request.

In one embodiment, the Y second-type information block(s) comprises (respectively comprise) Y first-type identifier(s).

In one embodiment, the Y second-type information block(s) corresponds (respectively correspond) to the Y first-type identifier(s).

In one embodiment, any of the Y second-type information block(s) comprises the first-type identifier.

In one embodiment, a first-type identifier field is a field in any of the Y second-type information block(s).

In one embodiment, the first-type identifier field comprises 16 bits.

In one embodiment, the first-type identifier field is used to indicate a temporary identifier used by a MAC entity in a random access procedure.

In one embodiment, at least one of the Y second-type information block(s) comprises a UE Contention Resolution Identity.

In one embodiment, any of the Y second-type information block(s) comprises a UE Contention Resolution Identity.

In one embodiment, at least one of the Y second-type information block(s) does not comprise a UE Contention Resolution Identity.

In one embodiment, the UE Contention Resolution Identity is a MAC CE.

In one embodiment, the UE Contention Resolution Identity is a field in at least one of the Y second-type information block(s).

In one embodiment, the UE Contention Resolution Identity is a field in any of the Y second-type information block(s).

In one embodiment, the UE Contention Resolution Identity comprises an Uplink Common Control Channel Service Data Unit (UL CCCH SDU).

In one embodiment, the UE Contention Resolution Identity field comprises 48 bits.

In one embodiment, when a number of bits comprised in a UL CCCH SDU is greater than 48, the UE Contention Resolution field comprises first 48 bits in the UL CCCH SDU.

In one embodiment, any of the Y second-type information block(s) does not comprise the Uplink Grant, and any of the Y second-type information block(s) comprises the UE Contention Resolution Identity.

In one embodiment, any of the Y second-type information block(s) comprises the Uplink Grant, and any of the Y second-type information block(s) comprises the UE Contention Resolution Identity.

In one embodiment, the Uplink Grant field and the UE Contention Resolution Identity field do not exist at the same time in any of the Y second-type information block(s).

In one embodiment, any of the Y second-type information block(s) comprises the UE Contention Resolution Identity, and any of the Y second-type information block(s) does not comprise the first-type identifier.

In one embodiment, any of the Y second-type information block(s) does not comprise the Uplink Grant, and any of the Y second-type information block(s) does not comprise the first-type identifier.

In one embodiment, any of the Y second-type information block(s) comprises the UE Contention Resolution Identity, any of the Y second-type information block(s) does not comprise the Uplink Grant, and any of the Y second-type information block(s) does not comprise the first-type identifier.

In one embodiment, at least one of the Y second-type information block(s) comprises the target identifier.

In one embodiment, any of the Y second-type information block(s) does not comprise the target identifier.

In one embodiment, the target identifier belongs to the first-type identifier.

In one embodiment, the target identifier is one of the Y first-type identifier(s).

In one embodiment, the target identifier is not any of the Y first-type identifier(s).

In one embodiment, the Y second-type information block(s) comprises (comprise) the second target information block.

In one embodiment, a second target information block is one of the Y second-type information block(s).

In one embodiment, the Y second-type information block(s) does (do) not comprise the second target information block.

In one embodiment, when the target identifier is one of the Y first-type identifier(s), and the second target information block is one of the Y second-type information block(s) corresponding to the target identifier.

In one embodiment, when the Y first-type identifier(s) does (do) not comprise the target identifier, the Y second-type information block(s) does (do) not comprise the second target information block, and the second target information block corresponds to the target identifier.

In one embodiment, when the target identifier is the same as one of the Y first-type identifier(s), the second target information block is one of the Y second-type information block(s) corresponding to the target identifier, and the second target information block comprises the target identifier.

Embodiment 8

Figure 8:
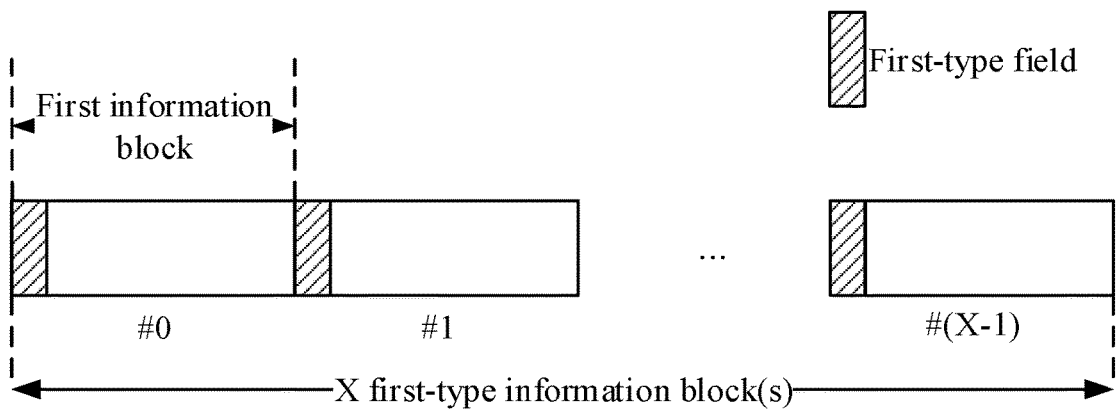
FIG. 8 illustrates a schematic diagram of relations among a first information block, X first-type information block(s) and X first-type field(s) according to one embodiment of the present disclosure.

Embodiment 8 illustrates a schematic diagram of relations among a first information block, X first-type information block(s) and X first-type field(s) according to one embodiment of the present disclosure, as shown in FIG. 8. In FIG. 8, the solid rectangle represents first-type information block in the present disclosure, and the slash-filled rectangle represent a first-type field in the present disclosure.

In Embodiment 8, the second radio signal comprises X first-type information block(s), and the first information block is one of the X first-type information block(s), X being a positive integer; the X first-type information block(s) comprises (respectively comprise) X first-type field(s), the first field is one of the X first-type field(s), a position of the first information block in the X first-type information block(s) is used to determine whether the first field is used to determine whether the second radio signal comprises the Y second-type information block(s).

In one embodiment, the second radio signal comprises X first-type information block(s), and the first information block is one of the X first-type information block(s), X being a positive integer.

In one embodiment, the X first-type information block(s) comprises (respectively comprise) X MAC subheafer(s).

In one embodiment, the X first-type information block(s) is (are respectively) X MAC subheader(s).

In one embodiment, the X first-type information block(s) comprises (respectively comprise) X first-type field(s), the first field is one of the X first-type field(s), and the first information block comprises the first field.

In one embodiment, a position of the first information block in the X first-type information block(s) is used to determine whether the first field is used to determine whether the second radio signal comprises the Y second-type information block(s).

In one embodiment, the X first-type information block(s) is(are) arranged in order, when the first information block is a first one of the X first-type information block(s), the first field is used to determine whether the second radio signal comprises the Y second-type information block(s).

In one subembodiment of the above embodiment, the first field indicates the first state, and the second radio signal does not comprise Y second-type information(s).

In one subembodiment of the above embodiment, the first field indicates the second state, and the second radio signal comprises Y second-type information block(s).

In one subembodiment of the above embodiment, the first field indicates the second state, a value interval to which the first value belongs determined by the second field is used to determine whether the second radio signal comprises the Y second-type information block(s).

In one subembodiment of the above embodiment, the first field indicates the second state, a value interval to which the first value belongs determined by the second field is the second value interval out of a first value interval and a second value interval, and the second radio signal comprises the Y second-type information block(s).

In one subembodiment of the above embodiment, the first field indicates the second state, a value interval to which the first value belongs determined by the second field is the first value interval out of a first value interval and a first value interval, and the second radio signal does not comprise the Y second-type information block(s).

In one embodiment, the X first-type information block(s) is(are) arranged in order, when the first information block is a first-type information block other than a first one of the X first-type information block(s), the first field is not used to determine whether the second radio signal comprises the Y second-type information block(s).

In one embodiment, the X first-type information block(s) is(are) arranged in order, when the first information block is a first-type information block other than a first one of the X first-type information block(s), whether the second radio signal comprises the Y second-type information block(s) is unrelated to the first field.

In one embodiment, the X first-type information block(s) is(are) arranged in order, when the first information block is a last one of the X first-type information block(s), the first field is not used to determine whether the second radio signal comprises the Y second-type information block(s).

In one embodiment, a position of the first information block in the X first-type information block(s) is used to determine whether the first field is used to determine an information format of the second information block.

In one embodiment, the X first-type information block(s) is(are) arranged in order, when the first information block is a first one of the X first-type information block(s), the first field is used to determine an information format of the second information block.

In one embodiment, the X first-type information block(s) is(are) arranged in order, when the first information block is a first-type information block other than a first one of the X first-type information block(s), the first field is not used to determine an information format of the second information block.

Embodiment 9

Figure 9:
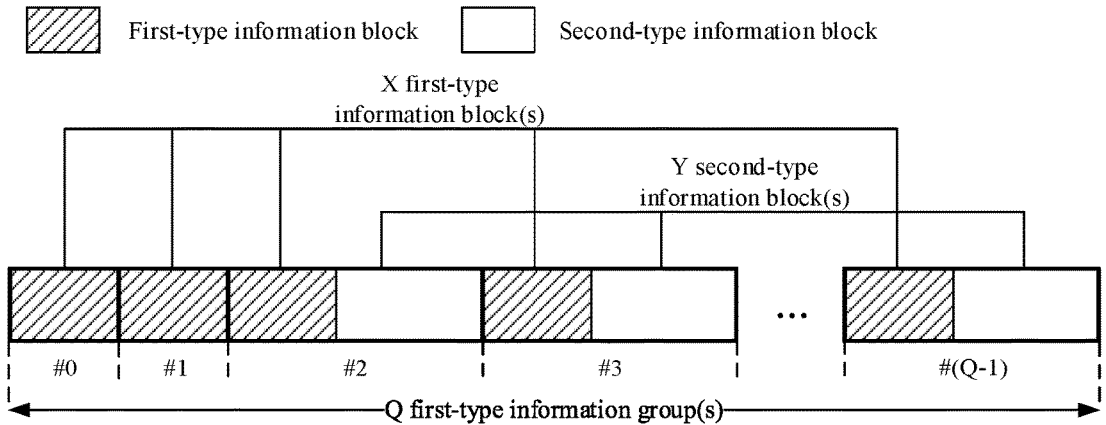
FIG. 9 illustrates a schematic diagram of relations among X first-type information block(s), Y second-type information block(s) and Q first-type information group(s) according to one embodiment of the present disclosure.

Embodiment 9 illustrates a schematic diagram of relations among X first-type information block(s), Y second-type information block(s) and Q first-type information group(s) according to one embodiment of the present disclosure, as shown in FIG. 9. In FIG. 9, the slash-filled rectangle represent a first-type information block in the present disclosure, a solid rectangle represent a first-type information block in the present disclosure, and a thick solid rectangle represents a first-type information group in the present disclosure.

In Embodiment 9, the second radio signal comprises Q first-type information group(s), and one of the Q first-type information group(s) comprises the first information block, Q being a positive integer.

In one embodiment, the Q first-type information group(s) is(are) arranged in order in the second radio signal.

In one embodiment, the Q first-type information group(s) comprises (respectively comprise) Q MAC subPDU(s).

In one embodiment, the Q first-type information group(s) is (are respectively) Q MAC subPDU(s).

In one embodiment, the first information block belongs to one of the Q first-type information group(s).

In one embodiment, the Q is equal to 1, the second radio signal only comprises one first-type information group, and the first-type information group comprises the first information block.

In one embodiment, the Q first-type information group(s) comprises (respectively comprise) Q first-type information block(s), and the first information block is one of the Q first-type information block(s).

In one embodiment, the Q first-type information group(s) comprises (respectively comprise) X first-type information block(s), the first information block is one of the X first-type information block(s), X being a positive integer not greater than the Q.

In one embodiment, any of the Q first-type information group(s) at least comprises one of the X first-type information block(s).

In one embodiment, the Q is equal to the X.

In one embodiment, one of the Q first-type information group(s) comprises an information block other than any of the X first-type information block(s).

In one embodiment, a first information group is one of the Q first-type information group(s), and the first information group comprises the first information block.

In one embodiment, the first information group is a MAC subPDU.

In one embodiment, the first information group only comprises the first information block.

In one embodiment, the first information group does not comprise an information block other than the first information block.

In one embodiment, the first information group does not comprise the second information block.

In one embodiment, the Q first-type information group(s) comprises (respectively comprise) Y second-type information block(s), and the second information block is one of the Y second-type information block(s).

In one embodiment, at least one of the Q first-type information group(s) comprises one of the Y second-type information block(s).

In one embodiment, any of the Q first-type information group(s) does not comprise any of the Y second-type information block(s).

In one embodiment, any of the Q first-type information group(s) does not comprise any of Y second-type information block(s), and the second information block is one of the Y second-type information block(s).

In one embodiment, any of the Q first-type information group(s) does not comprise the second information block.

In one embodiment, the first information block and the second information block do not belong to a same one of the Q first-type information group(s).

In one embodiment, a second information group is one of the Q first-type information group(s), the second information group comprises the second information block, and the second information group is different from the first information group.

In one embodiment, the second information group is a MAC subPDU.

In one embodiment, the first information block belongs to a first information group, the second information block belongs to a second information group, the first information group is one of the Q first-type information group(s), the second information group is one of the Q first-type information group(s), and the first information group is different from the second information block.

In one embodiment, one of the Q first-type information group(s) comprises one of the X first-type information block(s) and one of the Y second-type information block(s).

In one embodiment, one of the Q first-type information group(s) comprises one of the X first-type information block(s) and does not comprise any of the Y second-type information block(s).

In one embodiment, the second radio signal comprises the Q first-type information group(s), when the second radio signal comprises the second information group, at least one of the Q first-type information group(s) comprises the second information block.

In one embodiment, the second radio signal comprises the Q first-type information group(s), when the second radio signal does not comprise the second information group, any of the Q first-type information group(s) does not comprise the second information block.

In one embodiment, when the second radio signal comprises the second information block, the second information block belongs to one of the Q first-type information group(s).

In one embodiment, one of the Q first-type information group(s) comprises the first-type identifier.

In one embodiment, a first-type information block and a second-type information block in one of the Q first-type information group(s) jointly comprise the first-type identifier.

In one embodiment, a first-type information block in one of the Q first-type information group(s) comprises a first-type sub-identifier, a second-type information block in the one of the Q first-type information group(s) comprises a second-type sub-identifier, and the first-type sub-identifier and the second-type sub-identifier are used together to determine the first-type identifier.

Embodiment 10

Figure 10:
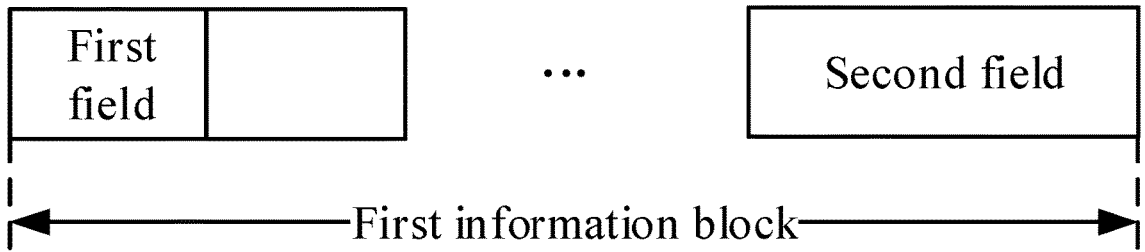
FIG. 10 illustrates a schematic diagram of relations among a first field, a second field and a first information block according to one embodiment of the present disclosure.

Embodiment 10 illustrates a schematic diagram of relations among a first field, a second field and a first information block according to one embodiment of the present disclosure, as shown in FIG. 10.

In Embodiment 10, the second radio signal in the present disclosure comprises the first information block, and the first information block comprises the first field and the second field.

In one embodiment, the first field is an Extension Field.

In one embodiment, the first field comprises one bit.

In one embodiment, the first field is used to indicate whether the first information group is a last one of the Q first-type information group(s).

In one embodiment, the first field being set to "1" is used to indicate that the first information group is not a last one of the Q first-type information group(s); the first field being set to "0" is used to indicate that the first information group is a last one of the Q first-type information group(s).

In one embodiment, the first field is not used to indicate whether the first information group is a last one of the Q first-type information group(s).

In one embodiment, whether the first field is used to indicate whether the first information group is a last one of the Q first-type information group(s) is related to the second field.

In one embodiment, whether the first field is used to indicate whether the first information group is a last one of the Q first-type information group(s) is related to the first value.

In one embodiment, whether the first field is used to indicate whether the first information group is a last one of the Q first-type information group(s) is related to a value space to which the first value belongs.

In one embodiment, the first information block comprises a Backoff Indicator (BI).

In one embodiment, the second field comprises a BI.

In one embodiment, the second field is a BI field.

In one embodiment, the second field is used to determine an overload condition in a cell.

In one embodiment, the second field comprises 4 bits.

In one embodiment, the first information block comprises one of Z characteristic identifier(s), Z being a positive integer.

In one embodiment, the second field comprises one of the Z characteristic sequence identifier(s).

In one embodiment, the second field is used to determine a characteristic sequence out of the Z characteristic sequence(s).

In one embodiment, the second field comprises a Random Access Preamble Identifier (RAPID).

In one embodiment, the second field is an RAPID field.

In one embodiment, the second field comprises 6 bits.

In one embodiment, the first field is an Extension Field, and the second field is a BI field.

In one embodiment, the first field is an Extension field, and the second field is an RAPID field.

In one embodiment, the first information block also comprises a field other than the first field and the second field.

In one embodiment, the first information block comprises a reserved bit.

In one embodiment, the first information block does not comprise a reserved bit.

In one embodiment, the first information block comprises the first field, a reserved bit and the second field.

In one embodiment, the first information comprises the first field and the second field, and the first information block does not comprise a reserved bit.

In one embodiment, the Z characteristic sequence identifier(s) is (are respectively) used to determine Z characteristic sequence(s), and the first sequence is one of the Z characteristic sequence(s).

In one embodiment, any of the Z characteristic sequence identifier(s) is an RAPID.

In one embodiment, each of the Z characteristic sequence(s) corresponds to each of Z characteristic sequence identifier(s).

In one embodiment, any of the Z characteristic sequence identifier(s) is a non-negative integer.

In one embodiment, any of the Z characteristic sequence identifier(s) is an RAPID.

In one embodiment, the Z characteristic sequence identifier(s) is (are respectively) 0, 1, 2, . . . , Z−1.

In one embodiment, the Z characteristic sequence identifier(s) is (are respectively) 1, 2, 3, . . . , Z.

In one embodiment, the Z characteristic sequence identifier(s) is (are respectively) an integer from 0 to Z−1.

In one embodiment, the Z characteristic sequence identifier(s) is (are respectively) an integer from 1 to Z.

In one embodiment, any of the Z characteristic sequence identifier(s) is a non-negative integer from 0 to 63.

In one embodiment, any of the Z characteristic sequence identifier(s) is a positive integer from 1 to 64.

In one embodiment, the first sequence identifier is one of the Z characteristic sequence identifier(s) corresponding to the first sequence.

In one embodiment, the first sequence identifier is used to determine the first sequence.

In one embodiment, the first sequence identifier is used to identify the first sequence.

In one embodiment, the first sequence identifier is an RAPID.

In one embodiment, the first sequence identifier is an integer from 0 to 63.

In one embodiment, the first sequence identifier is a positive integer from 1 to 64.

In one embodiment, the first sequence identifier is used to determine the first sequence out of the Z characteristic sequence(s).

In one embodiment, the target identifier is used to determine the first sequence out of Z characteristic sequence(s), and the first sequence is one of the Z characteristic sequence(s).

Embodiment 11

Figure 11:
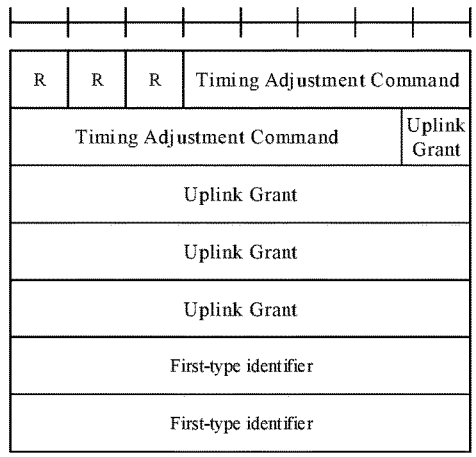
FIG. 11 illustrates a schematic diagram of an information format of a second information block according to one embodiment of the present disclosure.
Figure 11:
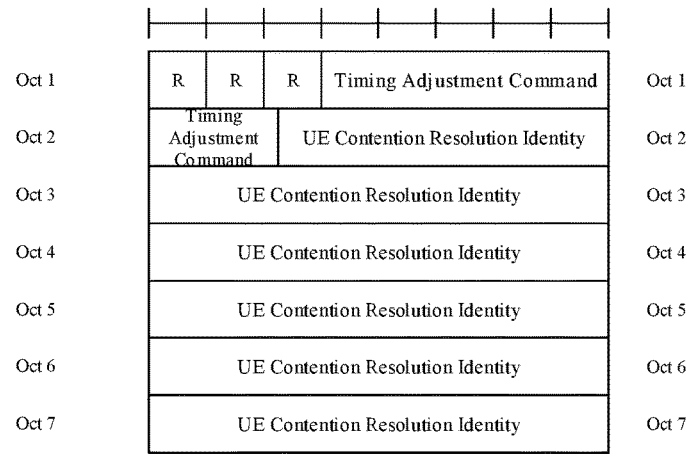

Embodiment 11 illustrates a schematic diagram of an information format of a second information block according to one embodiment of the present disclosure, as shown in FIG. 11. In FIG. 11, the box marked with the letter "R" represents a reserved bit, an information format of a second information in case A represents a first information format, and an information format of a second information block in case B represents a second information format.

In embodiment 11, the first field and a value interval to which the first value belongs in the present disclosure are used to determine an information format of the second information block; and the information format of the second information block is one of at least one information format.

In one embodiment, a first information format is one of the at least one information format, a second information format is one of the at least one information format, and the first information format is different from the second information format.

In one embodiment, an information format of the second information block is used to determine a number of all fifth-type fields comprised in the second information block.

In one embodiment, an information format of the second information block is used to determine a number of bits comprised in any of at least one fifth-type field comprised in the second information block.

In one embodiment, the second information block is used to indicate at least one fifth-type sub-information, and each of the at least one fifth-type field comprised in the second information block corresponds to each of the at least one fifth-type sub-information.

In one embodiment, an information format of the second information block is used to indicate a corresponding relation between the at least one fifth-type field comprised in the second information block and the at least one fifth-type sub-information.

In one embodiment, the first-type identifier is one of the at least one fifth-type sub-information.

In one embodiment, the second information block is one of the Y second-type information block(s).

In one embodiment, the second information block comprises at least one of a TAC, a UL Grant, a first-type identifier or a UE Contention Resolution Identity.

In one embodiment, the second information block comprises at least two of a TAC, a UL Grant, a first-type identifier and a UE Contention Resolution Identity.

In one embodiment, the first information format indicates that the second information block comprises a TAC, a UL Grant and a first-type identifier.

In one embodiment, the first information format indicates that the second information block comprises a reserved bit.

In one embodiment, the second information format indicates that the second information block comprises a TAC and a UE Contention Resolution Identity.

In one embodiment, a TAC is one of the at least one fifth-type sub-information.

In one embodiment, a UL Grant is one of the at least one fifth-type sub-information.

In one embodiment, a UE Contention Resolution Identity is one of the at least one fifth-type sub-information.

In one embodiment, the second information block comprises the TAC field.

In one embodiment, the TAC field is one of the at least one fifth-type field.

In one embodiment, the second information block comprises a UL Grant.

In one embodiment, the second information block does not comprise a UL Grant.

In one embodiment, the UL Grant field is one of the at least one fifth-type field.

In one embodiment, the second information block comprises the first-type identifier.

In one embodiment, the first-type identifier field is one of the at least one fifth-type field.

In one embodiment, the second information block comprises the target identifier.

In one embodiment, the second information block does not comprise the target identifier.

In one embodiment, the second information block comprises a UE Contention Resolution Identity.

In one embodiment, the second information block does not comprise a UE Contention Resolution Identity.

In one embodiment, the second information block does not comprise the UL Grant, and the second information block comprises the UE Contention Resolution Identity.

In one embodiment, the second information block comprises the UL Grant, and the second information block does not comprise the UE Contention Resolution Identity.

In one embodiment, the Uplink Grant field and the UE Contention Resolution Identity field do not exist at the same time in the second information block.

In one embodiment, the second information block comprises the UE Contention Resolution Identity, and the second information block does not comprise the first-type identifier.

In one embodiment, the second information block does not comprise the UL Grant, and the second information block does not comprise the first-type identifier.

In one embodiment, the second information block comprises the UE Contention Resolution Identity, the second information block does not comprise the UL Grant, and the second information does not comprise the first-type identifier.

In one embodiment, an information format of the second information block is the first information format out of the first information format and the second information format.

In one embodiment, an information format of the second information block is the second information format out of the first information format and the second information format.

In one embodiment, an information format of the second information block is only the second information format.

Embodiment 12

Figure 12:
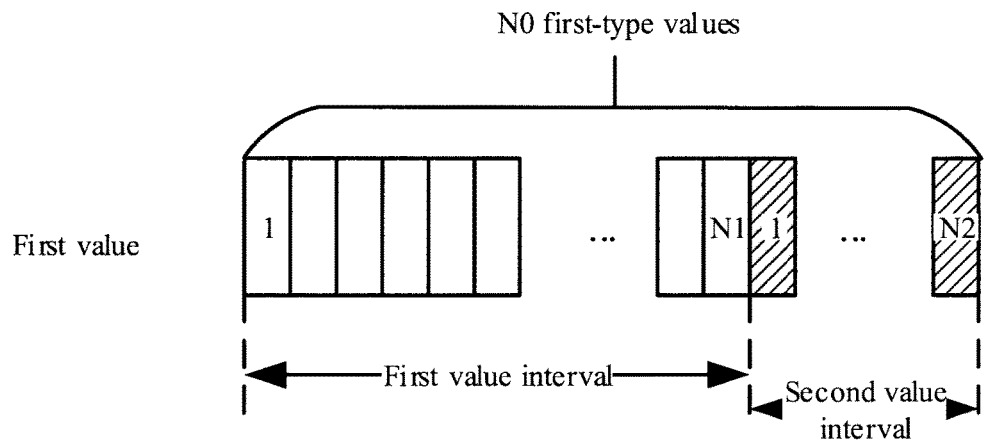
FIG. 12 illustrates a schematic diagram of relations among a first value, N0 first-type value(s), a first value interval and a second value interval according to one embodiment of the present disclosure.

Embodiment 12 illustrates a schematic diagram of relations among a first value, N0 first-type value(s), a first value interval and a second value interval according to one embodiment of the present disclosure, as shown in FIG. 12. In FIG. 12, the blank rectangle represents a first value interval in the present disclosure, and the slash-filled rectangle represents a second value in the present disclosure.

In Embodiment 12, a value interval to which a first value belongs in the present disclosure is one of at least one value interval, the at least one value interval comprises N0 first-type value(s), and the first value is one of the N0 first-type value(s), N0 being a positive integer.

In one embodiment, a value interval to which the first value belongs is a first value interval, and the first value interval is one of the at least one value interval.

In one embodiment, a value interval to which the first value belongs is a second value interval, and the second value interval is one of the at least one value interval.

In one embodiment, the first value interval is different from the second value interval.

In one embodiment, a value interval of a value determined by the second field is divided into at least one value interval, the first value interval is one of the at least one value interval, the second value interval is one of the at least one value interval, and the first value interval is different from the second value interval.

In one embodiment, the first value interval comprises N1 first-type value(s), the second value interval comprises N2 first-type interval(s), the N1 first-type interval(s) and the N2 first-type value(s) belong to the N0 first-type values, N1 and N2 are positive integers, and a sum of the N1 and the N2 is not greater than the N0.

In one embodiment, the N0 is equal to 16.

In one embodiment, the N1 is equal to 14.

In one embodiment, the N2 is equal to 2.

In one embodiment, the N2 is equal to 1.

In one embodiment, the first value interval is orthogonal to the second value interval, that is, the N1 first-type value(s) comprised in the first value interval does (do) not belong to the second value interval.

In one embodiment, the first value interval is orthogonal to the second value interval, that is, the N2 first-type value(s) comprised in the second value interval does (do) not belong to the first value interval.

In one embodiment, a first target value is a first-type value in the first value interval, and the second value interval does not comprise the first target value.

In one embodiment, a second target value is a first-type value in the second value interval, and the first value interval does not comprise the second target value.

In one embodiment, the first value interval overlaps with the second value interval.

In one embodiment, a third target value is a first-type value in the first value interval, and the second value interval comprises the third target value.

In one embodiment, a fourth target value is a first-type value in the second value interval, and the first value interval comprises the fourth target value.

In one embodiment, the first field indicates the second state, a value interval to which the first value belongs is used to determine an information format of the second information block.

In one embodiment, the first field indicates the second state, a value interval to which the first value belongs is the first value interval, and an information format of the second information is the first information format.

In one embodiment, the first field indicates the second state, a value interval to which the first value belongs is the second value interval, and an information format of the second information is the second information format.

In one embodiment, the first value interval comprises non-negative integers from 0 to 13.

In one embodiment, the second value interval comprises positive integers from 14 to 15.

In one embodiment, the second value interval only comprises 14.

In one embodiment, the second value interval only comprises 15.

In one embodiment, the first field is set to "0", a value interval to which the first value belongs is the first value interval, and an information format of the second information is the first information format.

In one embodiment, the first field is set to "0", a value interval to which the first value belongs is the second value interval, and an information format of the second information is the second information format.

In one embodiment, the first field is set to "0", the first value is any non-negative integer from 0 to 13, and an information format of the second information block is the first information format.

In one embodiment, the first field is set to "0", the first value is a positive integer of one of 14 or 15, and an information format of the second information block is the second information format.

In one embodiment, the first field is set to "0", the first value is set to 14, and an information format of the second information block is the second information format.

In one embodiment, the first field is set to "0", the first value is set to 15, and an information format of the second information block is the second information format.

In one embodiment, an illegal communication node assumes that the first value only belongs to the first value interval.

In one embodiment, the illegal communication node assumes that the first value only belongs to the first value interval out of the first value interval and the second value interval.

In one embodiment, the illegal communication node does not assume that the first value belongs to the second value interval.

In one embodiment, the first value belongs to the first value interval, and the illegal communication node assumes the first value to be valid.

In one embodiment, the first value belongs to the second value interval, and the illegal communication node assumes the first value to be invalid.

In one embodiment, the first value belongs to the second value interval, and the illegal communication node assumes that the second radio signal is not correctly received.

In one embodiment, the first value belongs to the second value interval, and the illegal communication node assumes that the second radio signal is wrongly detected.

In one embodiment, the first value belongs to the second value interval, and the illegal communication node assumes that the first information block is not correctly received.

In one embodiment, for the illegal communication node, the first field is used to indicate whether the first information block is a last one of the X first-type information block(s).

In one embodiment, the first field indicates the first state, and the illegal communication node assumes that the first information block is not a last one of the X first-type information block(s).

In one embodiment, the first field indicates the second state, and the illegal communication node assumes that the first information block is a last one of the X first-type information block(s).

In one embodiment, the first field is set to "1", and the illegal communication node assumes that the first information block is not a last one of the X first-type information block(s).

In one embodiment, the first field is set to "0", and the illegal communication node assumes that the first information block is a last one of the X first-type information block(s).

In one embodiment, for a legal communication node, the first field is used to determine whether the second radio signal comprises a second information block.

In one embodiment, for the legal communication node, the first field is used to determine an information format of the second information block.

In one embodiment, the illegal communication node comprises UEs not supporting 3GPP Release-16 and subsequent versions.

In one embodiment, the illegal communication node comprises UEs only supporting 3GPP Release-15 version.

In one embodiment, the illegal communication node comprises a UE not supporting 2-step RACH.

In one embodiment, the illegal communication node comprises a UE only supporting 4-step RACH.

In one embodiment, the legal communication node comprises UEs supporting 3GPP Release-16 and subsequent versions.

In one embodiment, the legal communication node comprises a UE supporting 2-step RACH.

In one embodiment, the legal communication node comprises a UE supporting 2-step RACH and 4-step RACH.

In one embodiment, the first node belongs to the legal communication node.

In one embodiment, the first node belongs to the illegal communication node.

Embodiment 13

Figure 13:
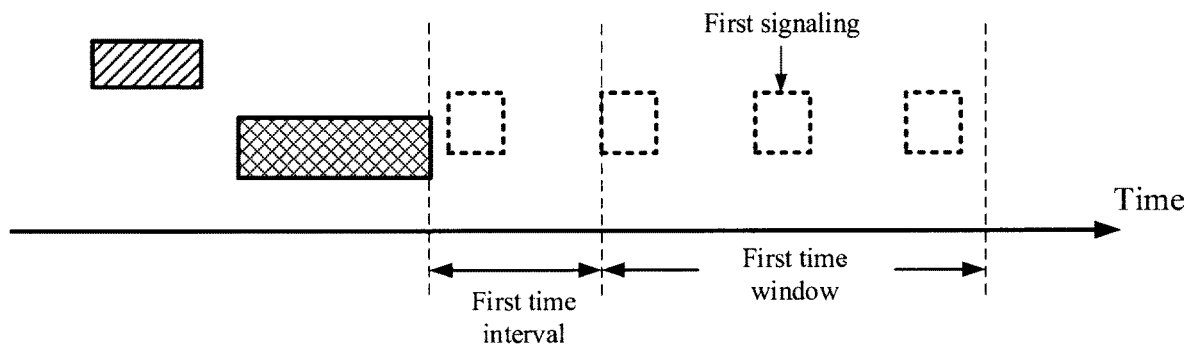
FIG. 13 illustrates a schematic diagram of relations among a first sequence, a first radio signal, a first signaling and a first time window according to one embodiment of the present disclosure.

Embodiment 13 illustrates a schematic diagram of relations among a first sequence, a first radio signal, a first signaling and a first time window according to one embodiment of the present disclosure, as shown in FIG. 13. In FIG. 13, the horizontal axis represents time, the slash-filled rectangle represents a first sequence, the cross-line-filled rectangle represents a first radio signal, each unfilled dotted rectangle represents a time monitoring a first signaling, and a time interval between an end time of time-domain resources occupied by a first radio signal and a start time of a first time window is a first time window.

In Embodiment 13, at least one of air-interface resources occupied by the first sequence in the present disclosure or air-interface resources occupied by the first radio signal are used to determine a start time of the first time window.

In one embodiment, time-domain resources occupied by the first signaling belong to the first time window.

In one embodiment, the first time window comprises time-domain resources occupied by the first signaling.

In one embodiment, the first signaling is transmitted in the first time window.

In one embodiment, the first node monitors the first signaling in the first time window.

In one embodiment, the monitoring refers to a blind detection based reception, that is, the first node receives a signal in the first time window and performs decoding operation; when the decoding according to a CRC bit is determined correct, judges that the first signaling is successfully received in the first time window; otherwise judges that the first signaling is not successfully received in the first time window.

In one embodiment, the monitoring refers to a coherent detection based reception, that is, the first node performs a coherent reception on a radio signal with an RS sequence corresponding to a DMRS of the first signaling in the first time window, and measures energy of a signal obtained after the coherent reception; if the energy of the signal obtained after the coherent reception is greater than a first given threshold, judges that the first signaling is successfully received in the first time window; otherwise judges that the first signaling is not successfully received in the first time window.

In one embodiment, the monitoring refers to an energy detection based reception, that is, the first node senses energy of a radio signal in the first time window and averages it on time to obtain received energy; if the received energy is greater than a second given threshold, judges that the first signaling is successfully received in the first time window; otherwise judges that the first signaling is not successfully received in the first time window.

In one embodiment, the first signaling being detected refers to the first signaling is received based on a blind detection, and the decoding is determined correct according to a CRC bit.

In one embodiment, air-interface resources occupied by the first radio signal are used to determine a start time of the first time window.

In one embodiment, air-interface resources occupied by the first radio signal comprise time-domain resources occupied by the first radio signal, frequency-domain resources occupied by the first radio signal and code-domain resources occupied by the first radio signal.

In one embodiment, air-interface resources occupied by the first radio signal comprise time-domain resources occupied by the first radio signal.

In one embodiment, air-interface resources occupied by the first radio signal comprise frequency-domain resources occupied by the first radio signal.

In one embodiment, air-interface resources occupied by the first radio signal comprise code-domain resources occupied by the first radio signal.

In one embodiment, air-interface resources occupied by the first radio signal comprise time-domain resources occupied by the first radio signal.

In one embodiment, air-interface resources occupied by the first radio signal comprise frequency-domain resources occupied by the first radio signal.

In one embodiment, air-interface resources occupied by the first radio signal comprise code-domain resources occupied by the first radio signal.

In one embodiment, air-interface resources occupied by the first radio signal comprise time-domain resources occupied by the first radio signal and frequency-domain resources occupied by the first radio signal.

In one embodiment, air-interface resources occupied by the first sequence are used to determine a start time of the first time window.

In one embodiment, air-interface resources occupied by the first sequence comprise time-domain resources occupied by the first sequence, frequency-domain resources occupied by the first sequence or code-domain resources occupied by the first sequence.

In one embodiment, air-interface resources occupied by the first sequence comprise time-domain resources occupied by the first sequence.

In one embodiment, air-interface resources occupied by the first sequence comprise frequency-domain resources occupied by the first sequence.

In one embodiment, air-interface resources occupied by the first sequence comprise code-domain resources occupied by the first sequence.

In one embodiment, a time interval between an end time of time-domain resources occupied by the first sequence and a start time of the first time window is a first time interval, a time length of the first time interval is not less than a first threshold, and the first threshold is pre-defined.

In one embodiment, a time interval between an end time of time-domain resources occupied by the first sequence and a start time of the first time window is a first time interval, a time length of the first time interval is not less than a first threshold, and the first threshold is configurable.

In one embodiment, a time interval between an end time of time-domain resources occupied by the first sequence and a start time of the first time window is a first time interval, and a time length of the first time interval is not less than 1 ms.

In one embodiment, a time interval between an end time of time-domain resources occupied by the first sequence and a start time of the first time window is a first time interval, and the first threshold is related to an SCS of subcarriers occupied by the first signaling.

In one embodiment, a time interval between an end time of time-domain resources occupied by the first sequence and a start time of the first time window is a first time interval, and the first threshold is equal to a time length of one of multicarrier symbols occupied by the first signaling.

In one embodiment, the above phrase of "an end time of time-domain resources occupied by the first sequence is used to determine a start time of the first time window" includes: an end time of time-domain resources occupied by the first sequence is a start time of the first time window.

In one embodiment, the above phrase of "an end time of time-domain resources occupied by the first sequence is used to determine a start time of the first time window" includes: an end time of time-domain resources occupied by the first sequence is not late than a start time of the first time window.

In one embodiment, the above phrase of "an end time of time-domain resources occupied by the first sequence is used to determine a start time of the first time window" includes: a start time of the first time window is a first time, an end time of time-domain resources occupied by the sequence is a second time, the first time is later than the second time, a length of a time interval between the first time and the second time is not less than a time length of one multicarrier symbol, and an SCS corresponding to the one multicarrier symbol is equal to an SCS adopted by the first signaling.

In one embodiment, the above phrase of "an end time of time-domain resources occupied by the first sequence is used to determine a start time of the first time window" includes: a start time of the first time window is a first time, an end time of time-domain resources occupied by the first sequence is a second time, the first time is later than the second time, a length of a time interval between the first time and the second time is equal to a time length of one multicarrier symbol, and an SCS corresponding to the one multicarrier symbol is equal to an SCS adopted by the first signaling.

In one embodiment, the above phrase of "an end time of time-domain resources occupied by the first sequence is used to determine a start time of the first time window" includes: a start time of the first time window is a first time, an end time of time-domain resources occupied by the first sequence is a second time, the first time is later than the second time, a length of a time interval between the first time and the second time is not less than a time length of one multicarrier symbol, the first time is a start time of an earliest Control Resource Set (CORESET) comprising a PDCCH Common Search Space, and an SCS corresponding to the one multicarrier symbol is equal to an SCS of the earliest CORESET.

In one embodiment, the above phrase of "an end time of time-domain resources occupied by the first sequence is used to determine a start time of the first time window" includes: a start time of the first time window is a first time, an end time of time-domain resources occupied by the first sequence is a second time, the first time is later than the second time, a length of a time interval between the first time and the second time is not less than a time length of one multicarrier symbol, the first time is a start time of an earliest CORESET comprising a Type1 PDCCH Common Search Space, and an SCS corresponding to the one multicarrier symbol is equal to an SCS of the earliest CORESET.

In one embodiment, the above phrase of "an end time of time-domain resources occupied by the first sequence is used to determine a start time of the first time window" includes: an end time of time-domain resources occupied by the first sequence is used by the first node to determine a start time of the first time window.

In one embodiment, the above phrase of "an end time of time-domain resources occupied by the first sequence is used to determine a start time of the first time window" includes: an end time of time-domain resources occupied by the first sequence is used to directly determine a start time of the first time window.

In one embodiment, the above phrase of "an end time of time-domain resources occupied by the first sequence is used to determine a start time of the first time window" includes: an end time of time-domain resources occupied by the first sequence is used to indirectly determine a start time of the first time window.

In one embodiment, the above phrase of "an end time of time-domain resources occupied by the first sequence is used to determine a start time of the first time window" includes: an end time of time-domain resources occupied by the first sequence is used to explicitly determine a start time of the first time window.

In one embodiment, the above phrase of "an end time of time-domain resources occupied by the first sequence is used to determine a start time of the first time window" includes: an end time of time-domain resources occupied by the first sequence is used to implicitly determine a start time of the first time window.

In one embodiment, time-domain resources occupied by the first radio signal are used to determine a start time of the first time window.

In one embodiment, a time interval between an end time of time-domain resources occupied by the first radio signal and a start time of the first time window is a first time window, a time length of the first time interval is not less than a first threshold, and the first threshold is pre-defined.

In one embodiment, a time interval between an end time of time-domain resources occupied by the first radio signal and a start time of the first time window is a first time window, a time length of the first time interval is not less than a first threshold, and the first threshold is configured.

In one embodiment, a time interval between an end time of time-domain resources occupied by the first radio signal and a start time of the first time window is a first time window, and a time length of the first time interval is not less than 1 ms.

In one embodiment, a time interval between an end time of time-domain resources occupied by the first radio signal and a start time of the first time window is a first time window, and the first threshold is related to an SCS of subcarriers occupied by the first signaling.

In one embodiment, a time interval between an end time of time-domain resources occupied by the first radio signal and a start time of the first time window is a first time window, and the first threshold is equal to a time length of one of multicarrier symbols occupied by the first signaling.

In one embodiment, the above phrase of "an end time of time-domain resources occupied by the first radio signal is used to determine a start time of the first time window" includes: an end time of time-domain resources occupied by the first radio signal is a start time of the first time window.

In one embodiment, the above phrase of "an end time of time-domain resources occupied by the first radio signal is used to determine a start time of the first time window" includes: an end time of time-domain resources occupied by the first radio signal is not later than a start time of the first time window.

In one embodiment, the above phrase of "an end time of time-domain resources occupied by the first radio signal is used to determine a start time of the first time window" includes: a start time of the first time window is a first time, an end time of time-domain resources occupied by the first radio signal is a second time, the first time is later than the second time, a length of a time interval between the first time and the second time is not less than a time length of one multicarrier symbol, and an SCS corresponding to the one multicarrier symbol is equal to an SCS adopted by the first signaling.

In one embodiment, the above phrase of "an end time of time-domain resources occupied by the first radio signal is used to determine a start time of the first time window" includes: a start time of the first time window is a first time, an end time of time-domain resources occupied by the first radio signal is a second time, the first time is late than the second time, a length of a time interval between the first time and the second time is equal to a time length of one multicarrier symbol, and an SCS corresponding to the one multicarrier symbol is equal to an SCS adopted by the first signaling.

In one embodiment, the above phrase of "an end time of time-domain resources occupied by the first radio signal is used to determine a start time of the first time window" includes: a start time of the first time window is a first time, an end time of time-domain resources occupied by the first radio signal is a second time, the first time is later than the second time, a length of a time interval between the first time and the second time is not less than a time length of one multicarrier symbol, the first time is a start time of an earliest CORESET comprising a PDCCH Common Search Space, and an SCS corresponding to the one multicarrier symbol is equal to an SCS of the earliest CORESET.

In one embodiment, the above phrase of "an end time of time-domain resources occupied by the first radio signal is used to determine a start time of the first time window" includes: a start time of the first time window is a first time, an end time of time-domain resources occupied by the first radio signal is a second time, the first time is later than the second time, a length of a time interval between the first time and the second time is not less than a time length of one multicarrier symbol, the first time is a start time of an earliest CORESET comprising a Type1 PDCCH Common Search Space, and an SCS corresponding to the one multicarrier symbol is equal to an SCS of the earliest CORESET.

In one embodiment, the above phrase of "an end time of time-domain resources occupied by the first radio signal is used to determine a start time of the first time window" includes: an end time of time-domain resources occupied by the first radio signal is used by the first node to determine a start time of the first time window.

In one embodiment, the above phrase of "an end time of time-domain resources occupied by the first radio signal is used to determine a start time of the first time window" includes: an end time of time-domain resources occupied by the first radio signal is used to directly determine a start time of the first time window.

In one embodiment, the above phrase of "an end time of time-domain resources occupied by the first radio signal is used to determine a start time of the first time window" includes: an end time of time-domain resources occupied by the first radio signal is used to indirectly determine a start time of the first time window.

In one embodiment, the above phrase of "an end time of time-domain resources occupied by the first radio signal is used to determine a start time of the first time window" includes: an end time of time-domain resources occupied by the first radio signal is used to explicitly determine a start time of the first time window.

In one embodiment, the above phrase of "an end time of time-domain resources occupied by the first radio signal is used to determine a start time of the first time window" includes: an end time of time-domain resources occupied by the first radio signal is used to implicitly determine a start time of the first time window.

In one embodiment, air-interface resources occupied by the first sequence and air-interface resources occupied by the first radio signal are used together to determine a start time of the first time window.

Embodiment 14

Figure 14:
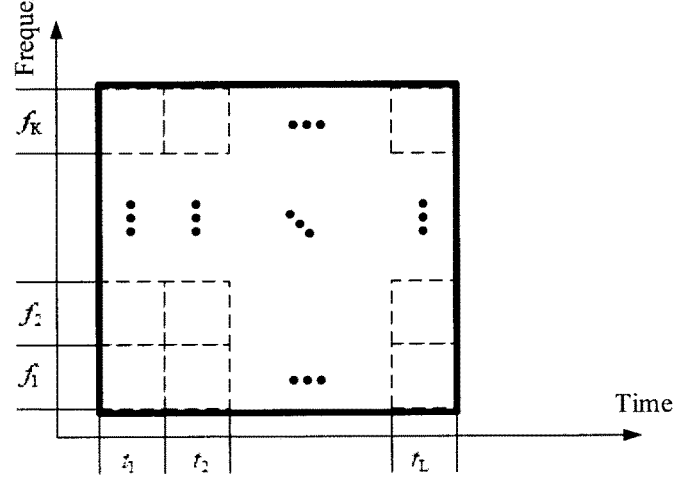
FIG. 14 illustrates a schematic diagram of time-frequency resources according to one embodiment of the present disclosure.

Embodiment 14 illustrates a schematic diagram of a time-frequency resource according to one embodiment of the present disclosure, as shown in FIG. 14. In FIG. 14, a dotted box represents a Resource Element (RE), and a solid rectangle represents a time-frequency resource. In FIG. 14, a time-frequency resource occupies K subcarrier(s) in frequency domain and L multicarrier symbol(s) in time domain, the K and the L being positive integers. In FIG. 14, $t_{=1}, t_2, \ldots, t_L$ represents (represent) the L symbol(s), and $f_1, f_2, \ldots, f_K$ represent(s) the K subcarrier(s).

In Embodiment 14, a time-frequency resource occupies K subcarrier(s) in frequency domain and L multicarrier symbol(s) in time domain, the K and the L being positive integers.

In one embodiment, the K is equal to 12.

In one embodiment, the K is equal to 72.

In one embodiment, the K is equal to 127.

In one embodiment, the K is equal to 240.

In one embodiment, the L is equal to 1.

In one embodiment, the L is equal to 2.

In one embodiment, the L is not greater than 14.

In one embodiment, any of the L multicarrier symbol(s) is at least one of a Frequency Division Multiple Access (FDMA), an Orthogonal Frequency Division Multiplexing (OFDM), a Single-Carrier Frequency Division Multiple Access (SC-FDMA), a Discrete Fourier Transform Spread Orthogonal Frequency Division Multiplexing (DFTS-OFDM), a Filter Bank Multi-Carrier (FBMC), or an Interleaved Frequency Division Multiple Access (IFDMA).

In one embodiment, the time-domain resource comprises at least one radio frame.

In one embodiment, the time-domain resource is a radio frame.

In one embodiment, the time-domain resource comprises at least one subframe.

In one embodiment, the time-domain resource is a subframe.

In one embodiment, the time-domain resource comprises at least one slot.

In one embodiment, the time-domain resource is a slot.

In one embodiment, the time-domain resource comprises at least one multi-carrier symbol.

In one embodiment, the time-domain resource is a multi-carrier symbol.

In one embodiment, the frequency-domain resource comprises at least one carrier.

In one embodiment, the frequency-domain resource is a carrier.

In one embodiment, the frequency-domain resource comprises at least one Bandwidth Part (BWP).

In one embodiment, the frequency-domain resource is a BWP.

In one embodiment, the frequency-domain resource comprises at least one subchannel.

In one embodiment, the frequency-domain resource is a subchannel.

In one embodiment, the subchannel comprises at least one Resource Block (RB).

In one embodiment, a number of RBs comprised in the subchannel is variable.

In one embodiment, the RB comprises at least one subcarrier in frequency domain.

In one embodiment, the RB comprises 12 subcarriers in frequency domain.

In one embodiment, the sub-channel comprises at least one PRB.

In one embodiment, a number of PRBs comprised in the subchannel is variable.

In one embodiment, the PRB comprises at least one subcarrier in frequency domain.

In one embodiment, the PRB comprises 12 subcarriers in frequency domain.

In one embodiment, the frequency-domain resource comprises at least one RB.

In one embodiment, the frequency-domain resource is an RB.

In one embodiment, the frequency-domain resource comprises at least one PRB.

In one embodiment, the frequency-domain resource is an PRB.

In one embodiment, the frequency-domain resource comprises at least one subcarrier.

In one embodiment, the frequency-domain resource is a subcarrier.

In one embodiment, the time-frequency resource comprises R RE(s), R being a positive integer.

In one embodiment, the time-frequency resource consists of R RE(s), R being a positive integer.

In one embodiment, any of the R RE(s) occupies a multicarrier symbol in time domain and a subcarrier in frequency domain.

In one embodiment, an SCS of the RE is measured by Hertz (Hz).

In one embodiment, an SCS of the RE is measured by Kilohertz (kHz).

In one embodiment, an SCS of the RE is measured by Megahertz (MHz).

In one embodiment, a symbol length of a multicarrier symbol of the RE is measured by sampling point.

In one embodiment, a symbol length of a multicarrier symbol of the RE is measured by μs.

In one embodiment, a symbol length of a multicarrier symbol of the RE is measured by ms.

In one embodiment, an SCS of the RE is at least one of 1.25 kHz, 2.5 kHz, 5 kHz, 15 kHz, 30 kHz, 60 kHz, 120 kHz or 240 kHz.

In one embodiment, the time-frequency resource comprises the K subcarrier(s) and the L multicarrier symbol(s), and a product of the K and the L being not less than the R.

In one embodiment, the time-frequency resource does not comprise an RE allocated to a Guard Period (GP).

In one embodiment, the time-frequency resource does not comprise a RE allocated to a Reference Signal (RS).

In one embodiment, the time-frequency resource does not comprise an RE allocated to the first-type signal in the present disclosure.

In one embodiment, the time-frequency resource does not comprise an RE allocated to the first-type channel in the present disclosure.

In one embodiment, the time-frequency resource does not comprise an RE allocated to the second-type signal in the present disclosure.

In one embodiment, the time-frequency resource does not comprise an RE allocated to the second-type channel in the present disclosure.

In one embodiment, the time-frequency resource comprises at least one RB.

In one embodiment, the time-frequency resource belongs to an RB.

In one embodiment, the time-frequency resource is equal to an RB in frequency domain.

In one embodiment, the time-frequency resource comprises 6 RBs in frequency domain.

In one embodiment, the time-frequency resource comprises 20 RBs in frequency domain.

In one embodiment, the time-frequency resources comprise at least one PRB.

In one embodiment, the time-frequency resource belongs to a PRB.

In one embodiment, the time-frequency resource is equal to a PRB in frequency domain.

In one embodiment, the time-frequency resource comprises at least one Virtual Resource Block (VRB).

In one embodiment, the time-frequency resource belongs to an VRB.

In one embodiment, the time-frequency resource is equal to an VRB in frequency domain.

In one embodiment, the time-frequency resource comprises at least one Physical Resource Block pair (PRB).

In one embodiment, the time-frequency resource belongs to a PRB pair.

In one embodiment, the time-frequency resource is equal to a PRB pair in frequency domain.

In one embodiment, the time-frequency resource comprises at least one radio frame.

In one embodiment, the time-frequency resource belongs to a radio frame.

In one embodiment, the time-frequency resource is equal to a radio frame in time domain.

In one embodiment, the time-frequency resource comprises at least one subframe.

In one embodiment, the time-frequency resource belongs to a subframe.

In one embodiment, the time-frequency resource is equal to a subframe in time domain.

In one embodiment, the time-frequency resources comprise at least one slot.

In one embodiment, the time-frequency resource belongs to a slot.

In one embodiment, the time-frequency resource is equal to a slot in time domain.

In one embodiment, the time-frequency resources comprise at least one symbol.

In one embodiment, the time-frequency resource belongs to a symbol.

In one embodiment, the time-frequency resource is equal to a symbol in time domain.

In one embodiment, the time-frequency resource belongs to the third-type signal in the present disclosure.

In one embodiment, the time-frequency resource belongs to the third-type channel in the present disclosure.

In one embodiment, a duration of the time-domain resource in the present disclosure is equal to a duration of the time-frequency resource in time domain in the present disclosure.

Embodiment 15

Figure 15:
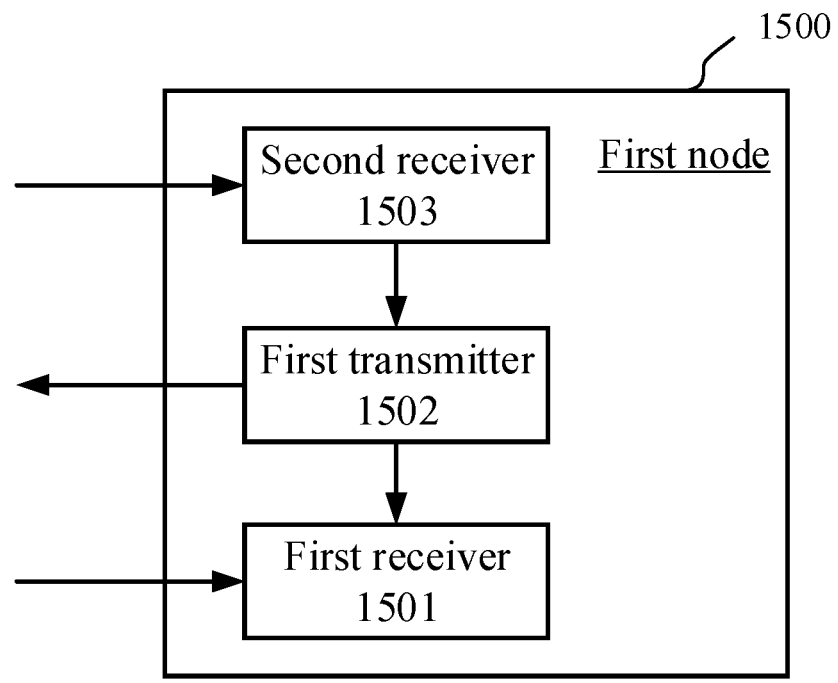
FIG. 15 illustrates a structure block diagram of a processing device in a first node according to one embodiment of the present disclosure.

Embodiment 15 illustrates a structure block diagram of a processing device used in a first node, as shown in FIG. 15. In Embodiment 15, a first node's processing device 1500 mainly consists of a first receiver 1501, a first transmitter 1502 and a second receiver 1503.

In one embodiment, the first receiver 1501 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 1502 comprises at least one of the antenna 452, the transmitter/receiver 454, the multi-antenna transmitting processor 457, the transmitting processor 468, the controller/processor 459, the memory 460, or the data source 467 in FIG. 4 of the present disclosure.

In one embodiment, the second receiver 1503 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In Embodiment 15, the first transmitter 1502 transmits a first sequence and a first radio signal, the first sequence is associated with the first radio signal; the first receiver 1501 receives a second radio signal; the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

In one embodiment, the first field and a value interval to which the first value belongs are used to determine an information format of the second information block.

In one embodiment, the second radio signal comprises Y second-type information block(s), and the second information block is one of the Y second-type information block(s), Y being a positive integer; the Y second-type information block(s) comprises (respectively comprise) Y first-type identifier(s); when the target identifier is one of the Y first-type identifier(s), the Y second-type information block(s) comprises (comprise) a second target information block, and the second target information block is one of the Y second-type information block(s) corresponding to the target identifier.

In one embodiment, the second radio signal comprises X first-type information block(s), and the first information block is one of the X first-type information block(s), X being a positive integer; the X first-type information block(s) comprises (respectively comprise) X first-type field(s), the first field is one of the X first-type field(s), a position of the first information block in the X first-type information block(s) is used to determine whether the first field is used to determine whether the second radio signal comprises the Y second-type information block(s).

In one embodiment, a value to which the first value belongs is a first value interval, and the first value interval is different from the second value interval; an illegal communication node assumes that the first value only belongs to the first value interval out of the first value interval and the second value interval.

In one embodiment, a value to which the first value belongs is a second value interval, and the first value interval is different from the second value interval; an illegal communication node assumes that the first value only belongs to the first value interval out of the first value interval and the second value interval.

In one embodiment, the first receiver 1501 receives a first signaling in a first time window; at least one of air-interface resources occupied by the first sequence or air-interface resources occupied by the first radio signal are used to determine a start time of the first time window; the first signaling is used to determine time-frequency resources occupied by the second radio signal.

In one embodiment, the first receiver 1501 receives a first signaling in a first time window; at least one of air-interface resources occupied by the first sequence or air-interface resources occupied by the first radio signal are used to determine a start time of the first time window; the first signaling is used to determine an MCS adopted by the second radio signal.

In one embodiment, the first receiver 1501 receives a first signaling in a first time window; at least one of air-interface resources occupied by the first sequence or air-interface resources occupied by the first radio signal are used to determine a start time of the first time window; the first signaling is used to determine time-frequency resources occupied by the second radio signal and an MCS adopted by the second radio signal.

In one embodiment, the second receiver 1503 receives a third information block; the third information block is used to determine a time length of a first time window.

In one embodiment, the first node 1500 is a UE.

In one embodiment, the first node 1500 is a relay node.

Embodiment 16

Figure 16:
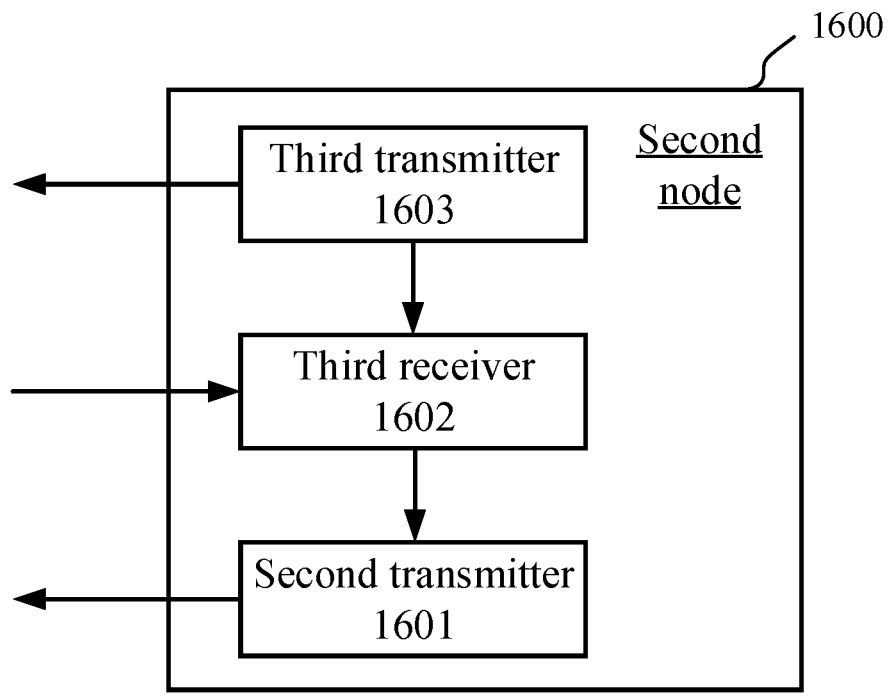
FIG. 16 illustrates a structure block diagram of a processing device in a second node according to one embodiment of the present disclosure.

Embodiment 16 illustrates a structure block diagram of a processing device used in a second node, as shown in FIG. 16. In FIG. 16, the second node's processing device 1600 mainly consists of a second transmitter 1601, a third receiver 1602 and a third transmitter 1603.

In one embodiment, the second transmitter 1601 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the third receiver 1602 comprises at least one of the antenna 420, the transmitter/receiver 418, the multi-antenna receiving processor 472, the receiving processor 470, the controller/processor 475 or the memory 476 in FIG. 4 of the present disclosure.

In one embodiment, the third transmitter 1603 comprises at least one of the antenna 420, the transmitter/receiver 418, the multi-antenna transmitting processor 471, the transmitting processor 416, the controller/processor 475 or the memory 476 in FIG. 4 of the present disclosure.

In Embodiment 16, the third receiver 1602 receives a first sequence and a first radio signal, and the first sequence is associated with the first radio signal; the second transmitter 1601 transmits a second radio signal; the first radio signal is used to carry a target identifier; the second radio signal comprises a first information block, the first information block comprises a first field and a second field, the second field is used to determine a first value, and the first value is a non-negative integer; the first field and a value interval to which the first value belongs are used to determine whether the second radio signal comprises a second information block, the second information block comprises a first-type identifier, and the target identifier belongs to the first-type identifier.

In one embodiment, the first field and a value interval to which the first value belongs is used to determine an information format of the second information block.

In one embodiment, the second radio signal comprises Y second-type information block(s), and the second information block is one of the Y second-type information block(s), Y being a positive integer; the Y second-type information block(s) comprises (respectively comprise) Y first-type identifier(s); when the target identifier is one of the Y first-type identifier(s), the Y second-type information block(s) comprises (comprise) a second target information block, and the second target information block is one of the Y second-type information block(s) corresponding to the target identifier.

In one embodiment, the second radio signal comprises X first-type information block(s), and the first information block is one of the X first-type information block(s), X being a positive integer; the X first-type information block(s) comprises (respectively comprise) X first-type field(s), the first field is one of the X first-type field(s), a position of the first information block in the X first-type information block(s) is used to determine whether the first field is used to determine whether the second radio signal comprises the Y second-type information block(s).

In one embodiment, a value to which the first value belongs is a first value interval, and the first value interval is different from the second value interval; an illegal communication node assumes that the first value only belongs to the first value interval out of the first value interval and the second value interval.

In one embodiment, a value to which the first value belongs is a second value interval, and the first value interval is different from the second value interval; an illegal communication node assumes that the first value only belongs to the first value interval out of the first value interval and the second value interval.

In one embodiment, the second transmitter 1601 transmits a first signaling in a first time window; at least one of air-interface resources occupied by the first sequence or air-interface resources occupied by the first radio signal are used to determine a start time of the first time window; and the first signaling is used to determine an MCS adopted by the second radio signal.

In one embodiment, the second transmitter 1601 transmits a first signaling in a first time window; at least one of air-interface resources occupied by the first sequence or air-interface resources occupied by the first radio signal are used to determine a start time of the first time window; and the first signaling is used to determine time-frequency resources occupied by the second radio signal;

In one embodiment, the second transmitter 1601 transmits a first signaling in a first time window; at least one of air-interface resources occupied by the first sequence or air-interface resources occupied by the first radio signal are used to determine a start time of the first time window; the first signaling is used to determine time-frequency resources occupied by the second radio signal and an MCS adopted by the second radio signal.

In one embodiment, the third transmitter 1603 transmits third information; the third information block is used to determine a time length of a first time window.

In one embodiment, the second node 1600 is a base station.

In one embodiment, the second node 1600 is a relay node.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:
   transmitting a first sequence and a first radio signal, the first sequence being associated with the first radio signal; and
   receiving a second radio signal;
   wherein the first radio signal is used to carry a target identifier; the second radio signal comprises a first information block, the first information block comprises a first field and a second field, the first field of the first information block only comprises one bit, the second field of the first information block is used to determine a first value, and the first value is a non-negative integer; the first field of the first information block and a value interval to which the first value belongs are used to determine whether the second radio signal comprises a second information block, the second information block comprises a first-type identifier, and the target identifier belongs to the first-type identifier; the first sequence and the first radio signal are respectively transmitted on a Physical Random Access Channel (PRACH) and a Physical Uplink Shared Channel (PUSCH); the first information block is a Multimedia Access Control (MAC) subheader; and the second information block is a MAC payload.

2. The method in a first node according to claim 1, wherein the first field of the first information block being set to 1 and 0 respectively indicate a first state and a second state; when the first field of the first information block indicates the first state, the second radio signal does not comprise the second information block; and when the first field of the first information block indicates the second state, the second field of the first information block is used to determine whether the second radio signal comprises the second information block.

3. The method in a first node according to claim 2, wherein the first field of the first information block indicates the second state; the value interval to which the first value belongs is a first value interval and the second radio signal does not comprise the second information block, or, the value interval to which the first value belongs is a second value interval and the second radio signal comprises the second information block.

4. The method in a first node according to claim 2, wherein the first radio signal comprises the target identifier; the target identifier is a Cell Radio Network Temporary Identifier (C-RNTI), or, the first-type identifier is a C-RNTI.

5. The method in a first node according to claim 1, wherein the first-type identifier is a Radio Network Temporary Identifier (RNTI); the target identifier is a Random Access Radio Network Temporary Identifier (RA-RNTI), or, the target identifier is used to generate a scrambling sequence of the first radio signal.

6. The method in a first node according to claim 1, wherein the first field of the first information block and a value interval to which the first value belongs are used to determine an information format of the second information block; the information format of the second information block is one of at least one information format, the at least one information format comprise a first information format and a second information format, and the first information format is different from the second information format.

7. The method in a first node according to claim 1, wherein the second radio signal comprises X first-type information groups, one of the X first-type information groups comprises the first information block, the X first-type information groups are arranged in order, the X first-type information groups are respectively X MAC sub Protocol Data Units (subPDUs), the X first-type information groups respectively comprise X first-type information blocks, the first information block is one of the X first-type information blocks, X being a positive integer greater than 1, and the X first-type information blocks are respectively X MAC subheaders; the X first-type information blocks respectively comprise X first-type fields, and the first field of the first information block is one of the X first-type fields; the second radio signal comprises Y second-type information blocks, and the second information block is one of the Y second-type information blocks, Y being a positive integer greater than 1;
   the Y second-type information blocks respectively comprise Y first-type identifiers; the Y second-type information blocks are respectively Y MAC payloads; any of the Y second-type information blocks comprises the first-type identifier; a first-type identifier field is a field in any of the Y second-type information blocks, and the first-type identifier field comprises 16 bits.

8. The method in a first node according to claim 7, comprising:
receiving a first signaling in a first time window, the first signaling is used to determine at least one of time-frequency resources occupied by the second radio signal or a Modulation and Coding Scheme (MCS) adopted by the second radio signal;
wherein the first signaling and the second radio signal are respectively transmitted on a Physical Downlink Control Channel (PDCCH) and a Physical Downlink Shared Channel (PDSCH); the first signaling is Downlink Control Information (DCI) format 1_0 in NR system; a first characteristic identifier is used to generate a scrambling sequence of the first signaling, the first characteristic identifier and the target identifier are respectively two different RNTIs, time-domain resources occupied by the first sequence and frequency-domain resources occupied by the first sequence are used together to determine the first characteristic identifier; at least one of air-interface resources occupied by the first sequence or air-interface resources occupied by the first radio signal are used to determine a start time of the first time window; the start time of the first time window is a first time, an end time of time-domain resources occupied by the first sequence is a second time, or, an end time of time-domain resources occupied by the first radio signal is a second time, the first time is later than the second time, a length of a time interval between the first time and the second time is not less than a time length of one multicarrier symbol, the first time is a start time of an earliest Control Resource Set (CORESET) comprising a PDCCH common search space, and a Subcarrier Spacing (SCS) corresponding to the one multicarrier symbol is equal to an SCS of the earliest CORESET.

9. The method in a first node according to claim 8, comprising:
receiving a third information block, the third information block being used to determine a time length of the first time window, the time length of the first time window being an integral multiple of a slot, and the third information block comprising one field in a Radio Resource Control (RRC) Information Element (IE).

10. A method in a second node for wireless communications, comprising:
receiving a first sequence and a first radio signal, the first sequence being associated with the first radio signal; and
transmitting a second radio signal;
wherein the first radio signal is used to carry a target identifier; the second radio signal comprises a first information block, the first information block comprises a first field and a second field, the first field of the first information block only comprises one bit, the second field of the first information block is used to determine a first value, and the first value is a non-negative integer; the first field of the first information block and a value interval to which the first value belongs are used to determine whether the second radio signal comprises a second information block, the second information block comprises a first-type identifier, and the target identifier belongs to the first-type identifier; the first sequence and the first radio signal are respectively transmitted on a PRACH and a PUSCH; the first information block is a MAC subheader; and the second information block is a MAC payload.

11. A first node for wireless communications, comprising:
a first transmitter, which transmits a first sequence and a first radio signal, the first sequence being associated with the first radio signal; and
a first receiver, which receives a second radio signal;
wherein the first radio signal is used to carry a target identifier; the second radio signal comprises a first information block, the first information block comprises a first field and a second field, the first field of the first information block only comprises one bit, the second field of the first information block is used to determine a first value, and the first value is a non-negative integer; the first field of the first information block and a value interval to which the first value belongs are used to determine whether the second radio signal comprises a second information block, the second information block comprises a first-type identifier, and the target identifier belongs to the first-type identifier; the first sequence and the first radio signal are respectively transmitted on a PRACH and a PUSCH; the first information block is a MAC subheader; the second information block is a MAC payload.

12. The first node according to claim 11, wherein t the first field of the first information block being set to 1 and 0 respectively indicate a first state and a second state; when the first field of the first information block indicates the first state, the second radio signal does not comprise the second information block; and when the first field of the first information block indicates the second state, the second field of the first information block is used to determine whether the second radio signal comprises the second information block.

13. The first node according to claim 12, wherein the first field of the first information block indicates the second state; the value interval to which the first value belongs is a first value interval and the second radio signal does not comprise the second information block, or, the value interval to which the first value belongs is a second value interval and the second radio signal comprises the second information block.

14. The first node according to claim 12, wherein the first radio signal comprises the target identifier; the target identifier is a C-RNTI, or, the first-type identifier is a C-RNTI.

15. The first node according to claim 11, wherein the first-type identifier is an RNTI;
the target identifier is an RA-RNTI, or, the target identifier is used to generate a scrambling sequence of the first radio signal.

16. The first node according to claim 11, wherein the first field of the first information block and a value interval to which the first value belongs are used to determine an information format of the second information block; the information format of the second information block is one of at least one information format, the at least one information format comprise a first information format and a second information format, and the first information format is different from the second information format.

17. The first node according to claim 11, wherein the second radio signal comprises X first-type information groups, one of the X first-type information groups comprises the first information block, the X first-type information groups are arranged in order, the X first-type information groups are respectively X MAC subPDUs, the X first-type information groups respectively comprise X first-type information blocks, the first information block is one of the X first-type information blocks, X being a positive integer greater than 1, and the X first-type information blocks are respectively X MAC subheaders; the X first-type information blocks respectively comprise X first-type fields, and the first field of the first information block is one of the X first-type fields; the second radio signal comprises Y second-type information blocks, and the second information block is one of the Y second-type information blocks, Y being a positive integer greater than 1; the Y second-type information blocks respectively comprise Y first-type identifiers; the Y second-type information blocks are respectively Y MAC payloads; any of the Y second-type information blocks comprises the first-type identifier; a first-type identifier field is a field in any of the Y second-type information blocks, and the first-type identifier field comprises 16 bits.

18. The first node according to claim 17, comprising:
the first receiver, which receives a first signaling in a first time window, the first signaling being used to determine at least one of time-frequency resources occupied by the second radio signal or an MCS adopted by the second radio signal;
wherein the first signaling and the second radio signal are respectively transmitted on a PDCCH and a PDSCH; the first signaling is DCI format 1_0 in NR system; a first characteristic identifier is used to generate a scrambling sequence of the first signaling, the first characteristic identifier and the target identifier are respectively two different RNTIs, time-domain resources occupied by the first sequence and frequency-domain resources occupied by the first sequence are used together to determine the first characteristic identifier; at least one of air-interface resources occupied by the first sequence or air-interface resources occupied by the first radio signal are used to determine a start time of the first time window; the start time of the first time window is a first time, an end time of time-domain resources occupied by the first sequence is a second time, or, an end time of time-domain resources occupied by the first radio signal is a second time, the first time is later than the second time, a time length of a time interval between the first time and the second time is not less than a time length of one multicarrier symbol, the first time is a start time of an earliest CORESET comprising a PDCCH common search space, and an SCS corresponding to the one multicarrier symbol is equal to an SCS of the earliest CORESET.

19. The first node according to claim 18, comprising:
a second receiver, which receives a third information block, the third information block being used to determine a time length of the first time window, the time length of the first time window being an integral multiple of a slot, and the third information block comprising one field in an RRC IE.

20. A second node for wireless communications, comprising:
a third receiver, which receives a first sequence and a first radio signal, the first sequence being associated with the first radio signal; and
a second transmitter, which transmits a second radio signal;
wherein the first radio signal is used to carry a target identifier; the second radio signal comprises a first information block, the first information block comprises a first field and a second field, the first field of the first information block only comprises one bit, the second field of the first information block is used to determine a first value, and the first value is a non-negative integer; the first field of the first information block and a value interval to which the first value belongs are used to determine whether the second radio signal comprises a second information block, the second information block comprises a first-type identifier, and the target identifier belongs to the first-type identifier; the first sequence and the first radio signal are respectively transmitted on a PRACH and a PUSCH; the first information block is a MAC subheader; the second information block is a MAC payload.

* * * * *